United States Patent
Khatri et al.

(10) Patent No.: US 10,268,262 B2
(45) Date of Patent: *Apr. 23, 2019

(54) DYNAMIC PEAK POWER LIMITING TO PROCESSING NODES IN AN INFORMATION HANDLING SYSTEM

(71) Applicant: DELL PRODUCTS, L.P., Round Rock, TX (US)

(72) Inventors: Mukund P Khatri, Austin, TX (US); Binay A. Kuruvila, Cedar Park, TX (US); John Erven Jenne, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 253 days.

This patent is subject to a terminal disclaimer.

(21) Appl. No.: 15/002,339

(22) Filed: Jan. 20, 2016

(65) Prior Publication Data

US 2017/0031431 A1 Feb. 2, 2017

Related U.S. Application Data

(63) Continuation-in-part of application No. 14/816,031, filed on Aug. 20, 2015, now Pat. No. 9,261,945.

(51) Int. Cl.
*G06F 1/32* (2006.01)
*G06F 1/26* (2006.01)
(Continued)

(52) U.S. Cl.
CPC ............ *G06F 1/3296* (2013.01); *G06F 1/266* (2013.01); *G06F 1/28* (2013.01); *G06F 1/324* (2013.01);
(Continued)

(58) Field of Classification Search
CPC .......... G06F 1/3296; G06F 1/266; G06F 1/28; G06F 1/3206; G06F 1/3225
See application file for complete search history.

(56) References Cited

U.S. PATENT DOCUMENTS 7,487,371 B2    2/2009  Simeral et al.
RE40,866 E  *   8/2009  Fung ..................... G06F 1/3203
                                                          713/300
(Continued)

*Primary Examiner* — Jaweed A Abbaszadeh
*Assistant Examiner* — Cheri L Harrington
(74) *Attorney, Agent, or Firm* — Isidore PLLC

(57) ABSTRACT

A computer-implemented method dynamically limits peak power consumption in processing nodes of an IHS. A power management micro-controller receives processing node-level power-usage and workload data from several node controllers, including current power consumption and a current workload, for each processing node within the IHS. A total available system power of the IHS is identified including a peak power output capacity and a sustained output power capacity. At least one node peak power threshold is determined based on the power-usage and workload data for each of the processing nodes. The node controllers are triggered to determine and set a device peak power limit for each of several variable performance devices within each of the processing nodes based on the node peak power threshold, wherein each of the variable performance devices dynamically adjusts a value of a corresponding device performance metric based on the device peak power limit.

19 Claims, 16 Drawing Sheets

(51) Int. Cl.
  *G06F 1/28* (2006.01)
  *G06F 1/3296* (2019.01)
  *G06F 1/3225* (2019.01)
  *G06F 1/3234* (2019.01)
  *G06F 1/3206* (2019.01)
  *G06F 1/324* (2019.01)
  *G06F 1/3246* (2019.01)

(52) U.S. Cl.
  CPC .......... *G06F 1/3206* (2013.01); *G06F 1/3225* (2013.01); *G06F 1/3234* (2013.01); *G06F 1/3246* (2013.01); *G06F 1/3275* (2013.01)

(56) References Cited

U.S. PATENT DOCUMENTS

| | | | |
|---|---|---|---|
| 7,861,102 B1* | 12/2010 | Ranganathan | G06F 1/3206 713/300 |
| 8,001,407 B2* | 8/2011 | Malone | G06F 1/3203 713/300 |
| 8,402,296 B2 | 3/2013 | Brundridge et al. | |
| 8,412,971 B2 | 4/2013 | Branover | |
| 8,621,253 B1 | 12/2013 | Brown | |
| 8,756,442 B2* | 6/2014 | Naffziger | G06F 1/324 713/300 |
| 2006/0218423 A1* | 9/2006 | Diefenbaugh | G06F 1/206 713/310 |
| 2007/0067657 A1* | 3/2007 | Ranganathan | G06F 1/206 713/320 |
| 2007/0198863 A1* | 8/2007 | Bose | G06F 1/206 713/300 |
| 2008/0109811 A1 | 5/2008 | Krauthgamer et al. | |
| 2008/0178032 A1* | 7/2008 | Walrath | G06F 1/3287 713/340 |
| 2009/0119523 A1* | 5/2009 | Totten | G06F 1/26 713/322 |
| 2009/0125737 A1* | 5/2009 | Brey | G06F 1/3203 713/322 |
| 2009/0235097 A1* | 9/2009 | Hamilton | G06F 1/3203 713/320 |
| 2010/0058091 A1 | 3/2010 | Lambert et al. | |
| 2010/0162006 A1* | 6/2010 | Therien | G06F 1/3203 713/300 |
| 2011/0006603 A1* | 1/2011 | Robinson | G06F 1/263 307/31 |
| 2011/0144818 A1* | 6/2011 | Li | G06F 1/3203 700/291 |
| 2011/0252248 A1 | 10/2011 | Cameron | |
| 2013/0145180 A1* | 6/2013 | Branover | G06F 1/00 713/300 |
| 2013/0246820 A1* | 9/2013 | Branover | G06F 1/3296 713/320 |
| 2013/0332753 A1* | 12/2013 | Varma | G06F 1/26 713/300 |
| 2014/0068282 A1 | 3/2014 | Jenne | |
| 2014/0068311 A1 | 3/2014 | Jenne | |
| 2014/0149760 A1* | 5/2014 | Drake | G06F 1/3234 713/320 |
| 2014/0310537 A1 | 10/2014 | Messick et al. | |
| 2014/0310539 A1 | 10/2014 | Messick et al. | |
| 2015/0095666 A1 | 4/2015 | Ananthakrishnan et al. | |
| 2015/0100805 A1 | 4/2015 | Jenne | |
| 2015/0241946 A1* | 8/2015 | Allen-Ware | G06F 1/3206 713/320 |
| 2016/0179164 A1* | 6/2016 | Park | G06F 1/324 713/322 |
| 2016/0266628 A1* | 9/2016 | Jain | G06F 1/28 |
| 2017/0192474 A1* | 7/2017 | Robinson | G06F 1/263 |

\* cited by examiner

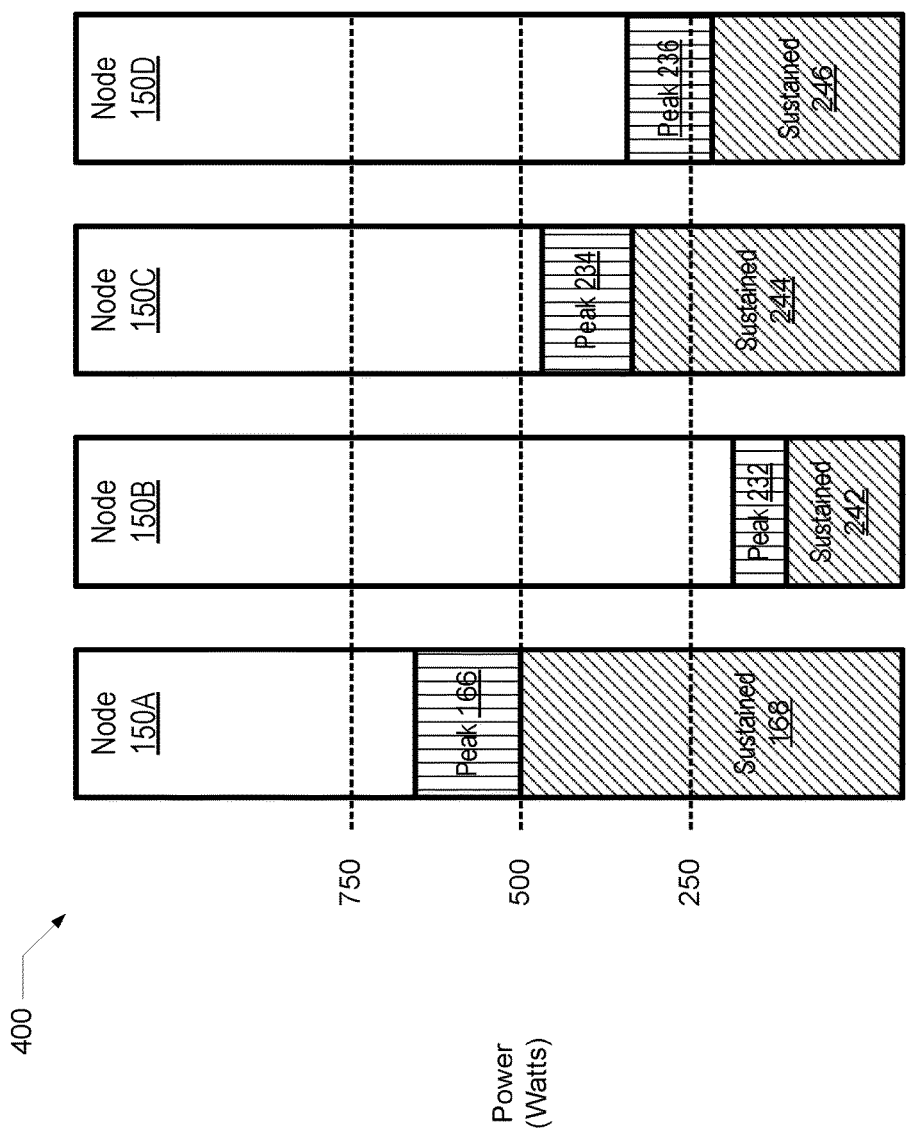

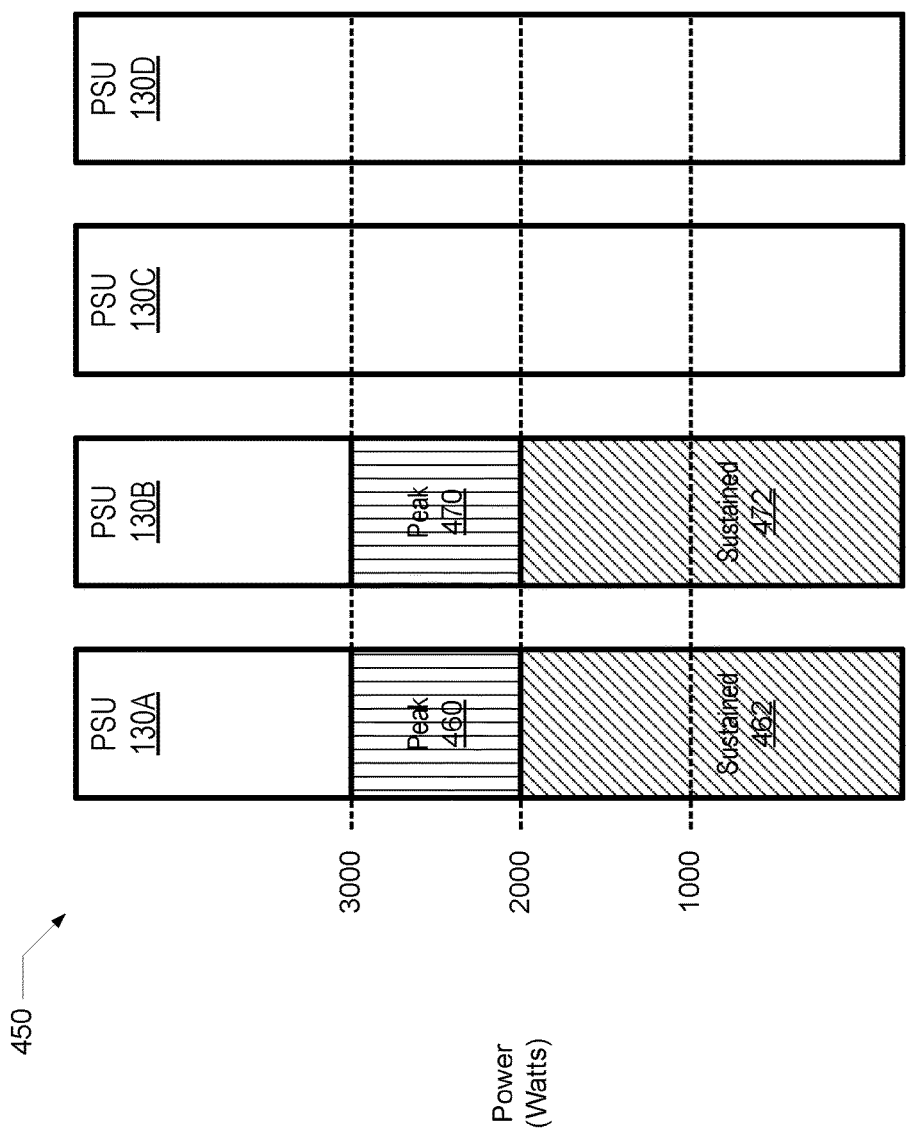

DYNAMIC PEAK POWER LIMITING TO PROCESSING NODES IN AN INFORMATION HANDLING SYSTEM

PRIORITY

The present application is a continuation-in-part (OP) of and claims priority benefit from U.S. patent application Ser. No. 14/816,031, filed Aug. 2, 2015, titled "Dynamic Peak Power Limiting To Processing Nodes In An Information Handling System," which is a OP of and claims the benefit of priority from U.S. application Ser. No. 13/598,966, filed Aug. 30, 2012, titled "Information Handling System Configuration for Power System Output Capability," which has now issued as U.S. Pat. No. 9,098,277. The entire content of both priority Applications is hereby incorporated herein by reference.

BACKGROUND

1. Technical Field

The present disclosure generally relates to information handling systems and in particular to dynamic peak power limiting to processing nodes in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providing power management and cooling to an information handling system is important to prevent loss of data and to maintain system reliability. During operation of an information handling system, events can occur that interrupt or reduce the amount of incoming AC power to the information handling system or the amount of available power from power supplies that deliver electrical power to the information handling system. Also, the processing components that consume power from the power supplies can modify their consumption of power to consume more or less power from one power-usage period to another. It is desirable for the information handling system to be able to seamlessly manage both increases and decreases in power demands from the components of the information handling system and to be able to manage interruptions in the delivery of power to the information handling system.

BRIEF SUMMARY

Disclosed are a computer-implemented method and an information handling system (IHS) to dynamically limit peak power consumption in processing nodes of an IHS. According to one embodiment, the method comprises receiving, at a power management micro-controller, processing node-level power-usage and workload data from several node controllers, including current power consumption and a current workload, for each processing node within the IHS. A total available system power of the IHS is identified including a peak power output capacity and a sustained output power capacity. At least one node peak power threshold is determined based on the power-usage and workload data for each of the processing nodes. The node controllers are triggered to determine and set a device peak power limit for each of several variable performance devices within each of the processing nodes based on the node peak power threshold, where each of the variable performance devices dynamically adjusts a corresponding device performance metric, such as a corresponding one of an operating frequency and data throughput, based on the device peak power limit.

Also disclosed is an IHS that comprises one or more processing nodes. Each of the processing nodes have at least one node controller. The node controllers each control node-level operations of the processing nodes within a corresponding node. The processing nodes each have at least one CPU communicatively coupled to the node controller. A power management module has a power management micro-controller and a memory coupled to the power management micro-controller. The power management module is communicatively coupled to the processing nodes. A power subsystem is communicatively coupled to the power management micro-controller and provides power distribution to the IHS. The power subsystem includes at least one power supply unit (PSU). The power management micro-controller has firmware executing thereon to enable dynamic peak power limiting to the processing nodes within the IHS. The firmware configures the power management micro-controller to receive processing node-level power-usage and workload data from the node controllers, including current power consumption and current workload for each processing node within the IHS. A total available system power of the IHS is identified, including a peak power output capacity and a sustained output power capacity. At least one node peak power threshold is determined based on the power-usage and workload data for each of the processing nodes. The node controllers are triggered to determine and set, based on the node peak power threshold, a device peak power limit for at least one variable performance device from among a memory device, a non-volatile memory express (NVMe) device, a graphics processing unit (GPU), and a many integrated core (MIC) device. The variable performance devices are respectively located within or are coupled to each of the corresponding processing nodes. Each of the devices dynamically adjusts a respective performance metric value based on the device peak power limit.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4A is a diagram illustrating peak and sustained power limits for several processing nodes, in accordance with one embodiment;

FIG. 4B is a diagram illustrating peak and sustained power capacity for several power supply units, in accordance with one embodiment;

DETAILED DESCRIPTION

Figure 1A:
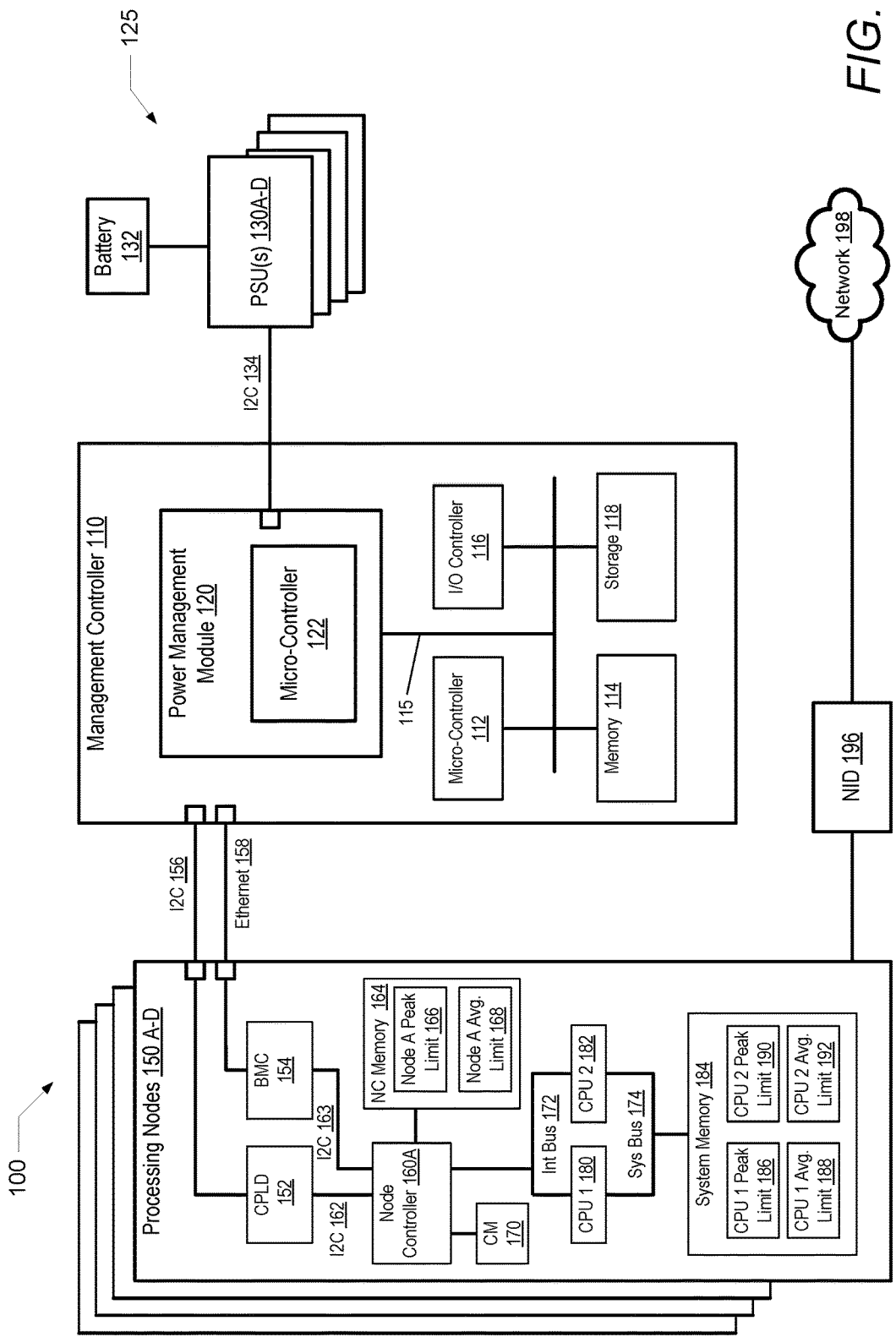
FIG. 1A is a block diagram illustration of an example information handling system (IHS) having CPU power control features, according to one or more embodiments.

The illustrative embodiments provide an information handling system (IHS) and a method performed within the IHS that dynamically limits peak power consumption in processing nodes of the IHS. According to one embodiment, the method comprises receiving, at a power management microcontroller, processing node-level power-usage and workload data from several node controllers, including current power consumption and a current workload, for each processing node within the IHS. A total available system power of the IHS is identified including a peak power output capacity and a sustained output power capacity. At least one node peak power threshold is determined based on the power-usage and workload data for each of the processing nodes. The node controllers are triggered to determine and set a device peak power limit for each of several variable performance devices within each of the processing nodes based on the node peak power threshold, where each of the variable performance level devices dynamically adjusts a corresponding device performance metric, such as a corresponding one of an operating frequency and data throughput, based on the device peak power limit.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Further, those of ordinary skill in the art will appreciate that the hardware components and basic configuration depicted in the various figures (e.g. FIG. 1) and described herein may vary. For example, the illustrative components within IRS 100 (FIG. 1) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, there is illustrated an example IHS 100 configured within a modular, expandable rack with modular configuration of various functional components inserted therein.

As presented in FIG. 1, IHS 100 comprises an arrangement of multiple computing or processing nodes along with power components. IHS 100 includes a management controller (MC) 110 that is communicatively coupled to processing nodes 150A-D via an I2C bus 156 and an Ethernet bus or cable 158. The plurality of computing or processing nodes 150 are individually labeled as processing nodes A-D 150A-D. MC 110 includes a micro-controller 112 (also generally referred to as a processor), which is coupled via an internal bus 115 to memory 114, I/O interface controller 116, storage 118 and power management module (PMM) 120. Memory 114 can be flash or other form of memory.

IHS 100 includes a power subsystem 125. Power subsystem 125 includes a power management module (PMM) 120, a plurality of power supply units (PSUs) 130A-D and a backup battery 132. PMM 120 includes a power management micro-controller 122. Backup battery 132 provides power to IHS 100 in the event of a loss of AC power source 148 or the failure of one or more PSUs 130A-D. PMM 120 is in communication with PSUs 130A-D via an I2C bus 134. PSUs 130A-D supply power to each of the processing nodes and other components within IHS 100 that require power via either one or more bus bars or power cables (not shown). PMM 120 can receive power supply data, capacity and settings from PSUs 130A-D via I2C bus 134.

As one aspect of power distribution within IHS 100, PMM 120 and micro-controller 122 can monitor (i) power consumption and workload data across the IHS 100 as well as (ii) the amount of available power provided by the PSUs 152, and PMM 120 can dynamically limit peak power consumption in the processing nodes 150A-D of the IHS based on power-usage and workload data. Micro-controller 122 can trigger changes in CPU operating frequency and power consumption at the individual processing nodes based on changes in the amount of available power, power consumption and workload data. In one embodiment, control of the power subsystem 125 can be provided by MC 110 instead of PMM 120.

In one implementation, each of the processing nodes 150A-D has a complex programmable logic device (CPLD) 152 and a board management controller (BMC) 154. CPLD 152 is coupled to PMM 120 via I2C bus 156. I2C bus 156 carries data and signals. BMC 154 is coupled to PMM 120 via an Ethernet cable 158. Ethernet cable 158 carries data and signals between PMM 120 and BMC 154. Specifically, according to at least one embodiment, PMM 120 provides certain control and/or management signals to the processing nodes 150A-D via I2C bus 156 and one or more select wires within Ethernet cable 158. In one embodiment, PMM 120 can send and receive data signals at a relatively fast rate via the dedicated I2C bus 156 or can send and receive data signals at a relatively slower rate via the Ethernet bus 158, depending on the desired data transfer rate.

Each of the processing nodes 150A-D includes a node controller 160 (collectively node controllers 160A-D) of which the controller for processing node 150A is shown. Node controller 160A is communicatively coupled to CPLD 152 via I2C bus 162 and to BMC 154 via I2C bus 163. Node controller 160A is further coupled to node controller (NC) memory 164, current monitor (CM) 170 and to central processing units (CPU), including CPU 1 180 and CPU 2 182. NC memory 164 can store for node controller 160A a node A peak power limit or threshold 166 and a node A sustained or average power limit or threshold 168. Node controller 160 is coupled to CPU 1 180 and CPU 2 182 via an interface bus 172. While two CPUs are shown, IHS 100 can include more or fewer CPUs. The CPUs support processing of data and information within each of the processing nodes. CM 170 can monitor, sense and measure the power consumed by processing node 150A and by each of CPU 1 180 and CPU 2 182. Node controllers 160A-D can track and record power usage and workload data for each of the processing nodes 160A-D and for each of the CPUs within each processing node.

CPU 1 180 and CPU 2 182 are communicatively coupled to system memory 184 via a system bus 174. System memory 184 can store a CPU 1 peak power limit 186 and a CPU 1 average power limit 188 for CPU 1 180. System memory 184 also stores a CPU 2 peak power limit 190 and a CPU 2 average power limit 192 for CPU 2 182. CPU 1 180 and CPU 2 182 can be selectively operated for short time periods at operating frequencies and power consumption well above the thermal design power (TDP) level.

IHS 100 further comprises a network interface device (NID) 196 that is communicatively coupled to each of processing nodes 150A-D. NID 196 enables IHS 100 to communicate and/or interface with other devices, services, and components that are located external to IHS 100. These devices, services, and components can interface with IHS 100 via an external network, such as example network 198, using one or more communication protocols. In one embodiment, a customer provisioned system/platform can comprises multiple devices located across a distributed network, and NID 196 enables IHS 100 to be connected to these other devices. Network 198 can be a local area network, wide area network, personal area network, and the like, and the connection to and/or between network and IHS 100 can be wired or wireless or a combination thereof. For purposes of discussion, Network 198 is indicated as a single collective component for simplicity. However, it is appreciated that network 198 can comprise one or more direct connections to other devices as well as a more complex set of interconnections as can exist within a wide area network, such as the Internet.

As described above, node controllers 160A-D can track and record power usage and workload data for each CPU within each processing node. As a result, node controllers 160A-D can set a central processing unit (CPU) peak power limit for each CPU within each of the processing nodes based on the node peak power threshold. In response to the CPU peak power limit being set for a corresponding CPU, the CPU dynamically adjusts an operating frequency based on the CPU peak power limit.

More generally, node controllers 160A-D can track and record power usage and workload data for each variable performance device within each processing node. As a result, node controllers 160A-D can set a device peak power limit for each variable performance device within each of the processing nodes based on the node peak power threshold. In response to the device peak power limit being set for a corresponding device, the device dynamically adjusts a value for a corresponding device performance metric based on the device peak power limit.

Figure 1B:
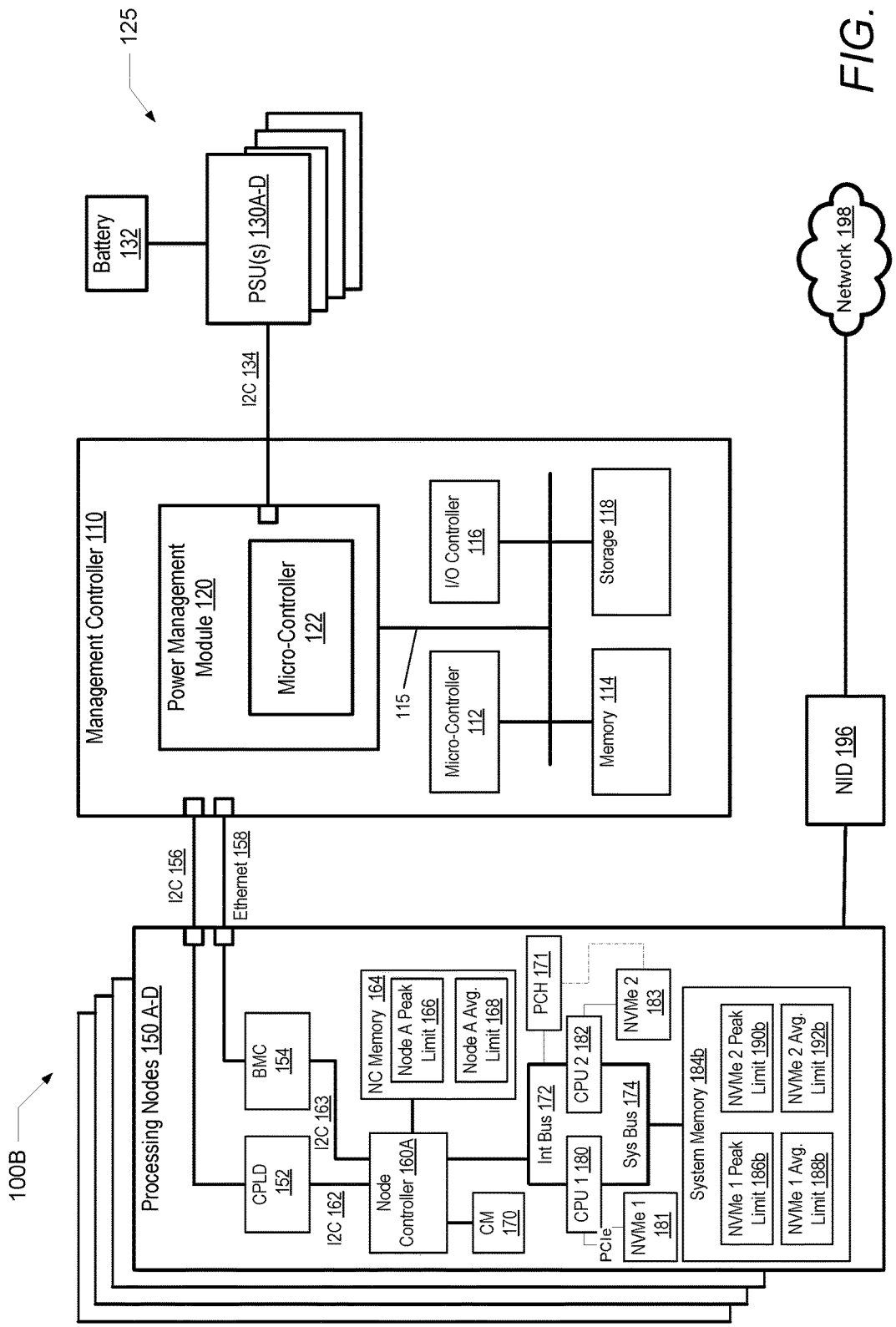
FIG. 1B is a block diagram illustration of an example information handling system (IHS) having Non-Volatile Memory Express (NVMe) power control features, according to one or more embodiments.
Figure 1C:
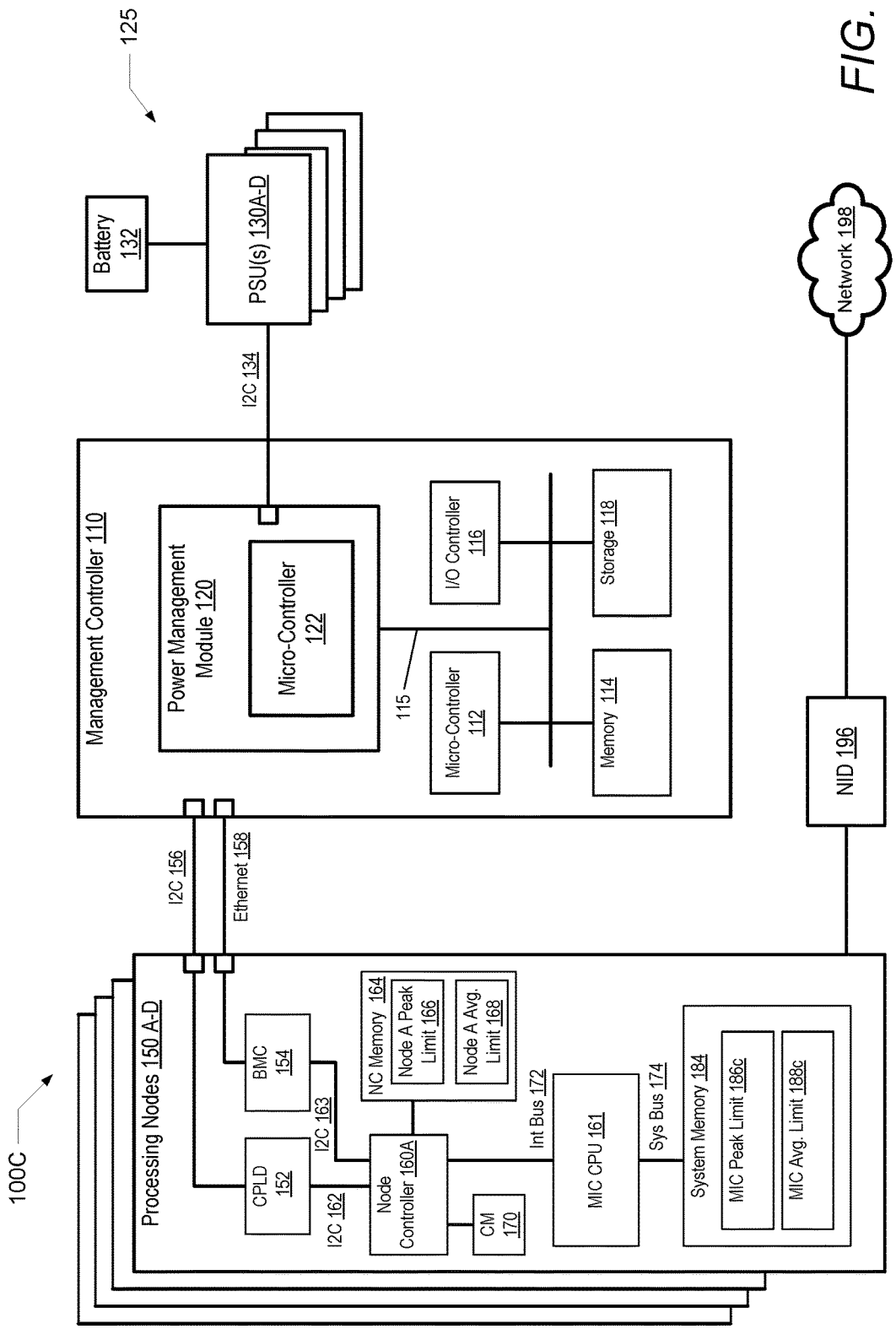
FIG. 1C is a block diagram illustration of an example information handling system (IHS) having Many Integrated Core (MIC) power control features, according to one or more embodiments.
Figure 1D:
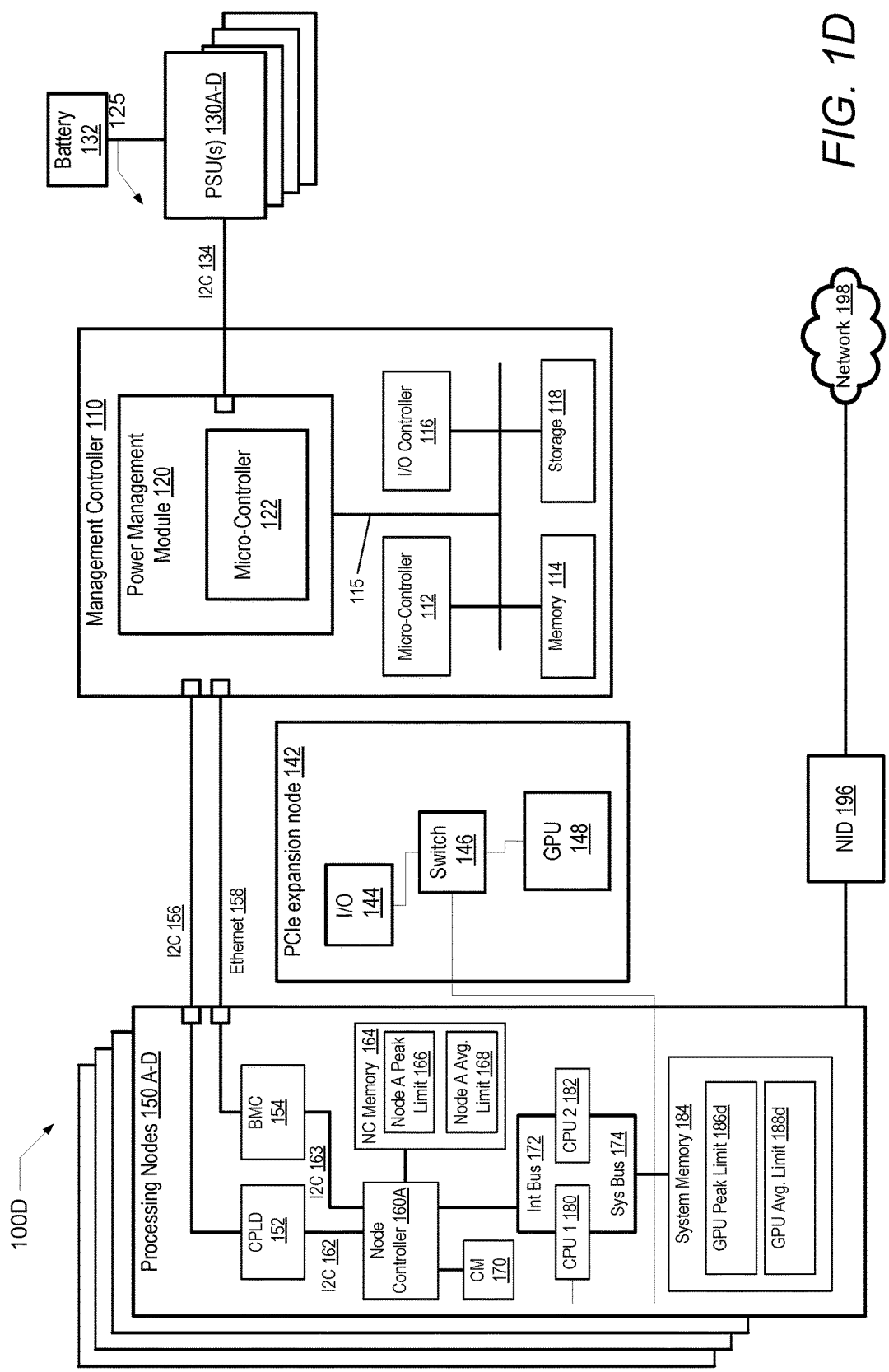
FIG. 1D is a block diagram illustration of an example information handling system (IHS) having Graphics Processing Unit (GPU) power control features, according to one or more embodiments.

Thus, in addition to tracking performance data for and controlling operation of a CPU, node controllers 160A-D can track and record power usage and workload data for other variable performance devices, which can include but are not limited to: a memory device, a non-volatile memory express (NVMe) device, a many integrated core (MIC) device, and a graphics processing unit (GPU). In FIGS. 1B-1D, several examples of these variable performance (level) devices for which power controls are applied are illustrated within corresponding IHS s.

In the IHS of FIG. 1B, node controllers 160A-D track and record power usage and workload data for an NVMe device coupled to a corresponding CPU. As illustrated, first NVMe 181 is coupled to first CPU 180 and second NVMe 183 is coupled to second CPU 182. In one implementation, an NVMe is coupled to a CPU via a corresponding PCIe lane. In another implementation, the NVMe is coupled to the CPU via a platform hub controller (PCH).

In FIG. 1B, node controllers determine and set a device peak power limit for each of a plurality of NVMe devices including first NVMe device 181 and second NVMe device 183 located within each of the processing nodes based on the node peak power threshold. In one implementation, each of first and second NVMe devices 181, 183 dynamically adjusts, based on the device peak power limit 186b, 190b, a respective data throughput. In another implementation, each of first and second NVMe devices 181, 183 dynamically adjusts, based on the device peak power limit 186b, 190b, a respective number of input/output operations per second (IOPS).

In the IHS of FIG. 1C, node controllers 160A-D track and record power usage and workload data for each MIC which is coupled between a corresponding node controller and system memory. As illustrated, MIC 180 is coupled between node controller 160A and memory 114. In FIG. 1C, node controllers determine and set a device peak power limit for each MIC device located within each of the processing nodes, based on the node peak power threshold. Each of the MIC devices dynamically adjusts a respective operating frequency, based on the device peak power limit.

In the IHS of FIG. 1D, node controllers 160A-D track and record power usage and workload data for each GPU. Each GPU is coupled via a switch in PCIe expansion node to a corresponding CPU within each respective processing node. As illustrated within IHS 100D, PCIe expansion node 142 includes GPU 146, which is coupled via switch 144 to first CPU 180. In FIG. 1D, node controllers determine and set a device peak power limit for each GPU device coupled to a corresponding CPU within each of the processing nodes based on the node peak power threshold. Each of the GPU devices dynamically adjusts a respective operating frequency, based on the device peak power limit.

Figure 2:
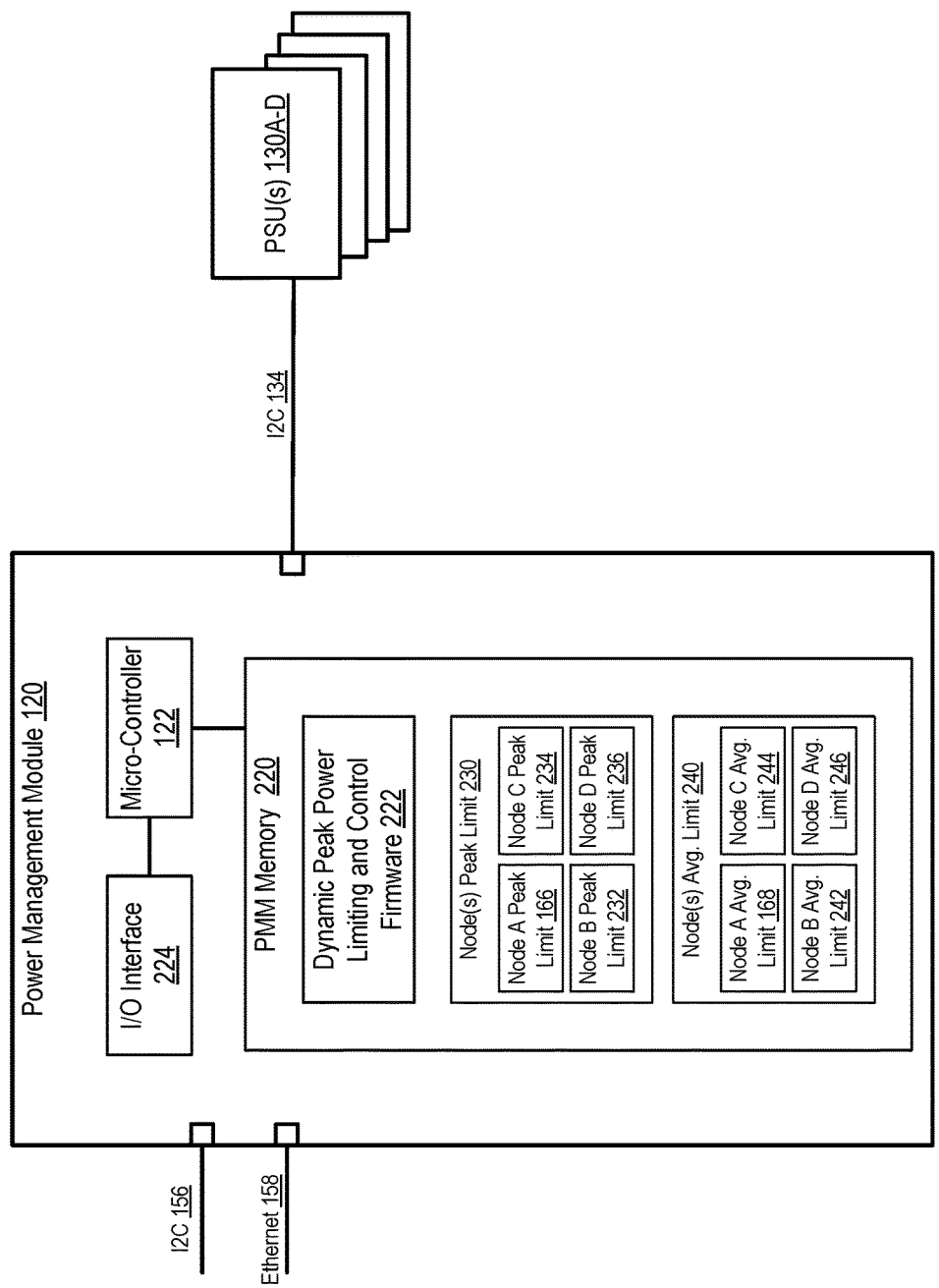
FIG. 2 is a block diagram illustrating details of the power management module that dynamically limits peak power consumption in processing nodes of the IHS, in accordance with one embodiment.

FIG. 2 illustrates further details of PMM 120 operating within IHS 100 to implement dynamic peak power limiting to the processing nodes. According to the described embodiments, dynamic peak power limiting can be achieved by triggering the node controllers 160 to determine and set a CPU peak power limit (186, 190) for each of the CPUs (180, 182) within each of the processing nodes based on the node peak power threshold 166, where each of the CPUs dynamically adjusts an operating frequency based on the CPU peak power limit.

Referring specifically to FIG. 2, PMM 120 comprises micro-controller 122, which is coupled to PMM memory 220. Illustrated within PMM memory 220 is dynamic peak power limiting and control (DPPLC) firmware 222, which is inclusive of the firmware that controls the operation of micro-controller 122 in controlling power management functions within IHS 100. I/O interface 224 is coupled to micro-controller 122 and provides connection points and hardware and firmware components that allow for interfacing with the processing nodes 150A-D via I2C bus 156 and Ethernet cable 158.

PMM memory 220 further contains node peak power limits or thresholds 230 and node average power limits or thresholds 240 for each of the processing nodes 150A-D. Node peak power limits or thresholds 230 include node A peak power limit 166, node B peak power limit 232, node C peak power limit 234 and node D peak power limit 236. Node average power limits or thresholds 230 include node A average power limit 168, node B average power limit 242, node C average power limit 244 and node D average power limit 246. PMM 120 is also coupled to PSUs 130A-D via an I2C bus 134. Micro-controller 122 can receive power capability data from PSUs 130A-D via I2C bus 134. The power capability data includes data such as a total available system power of the IHS, including a peak power output capacity and a sustained output power capacity.

Figure 3A:
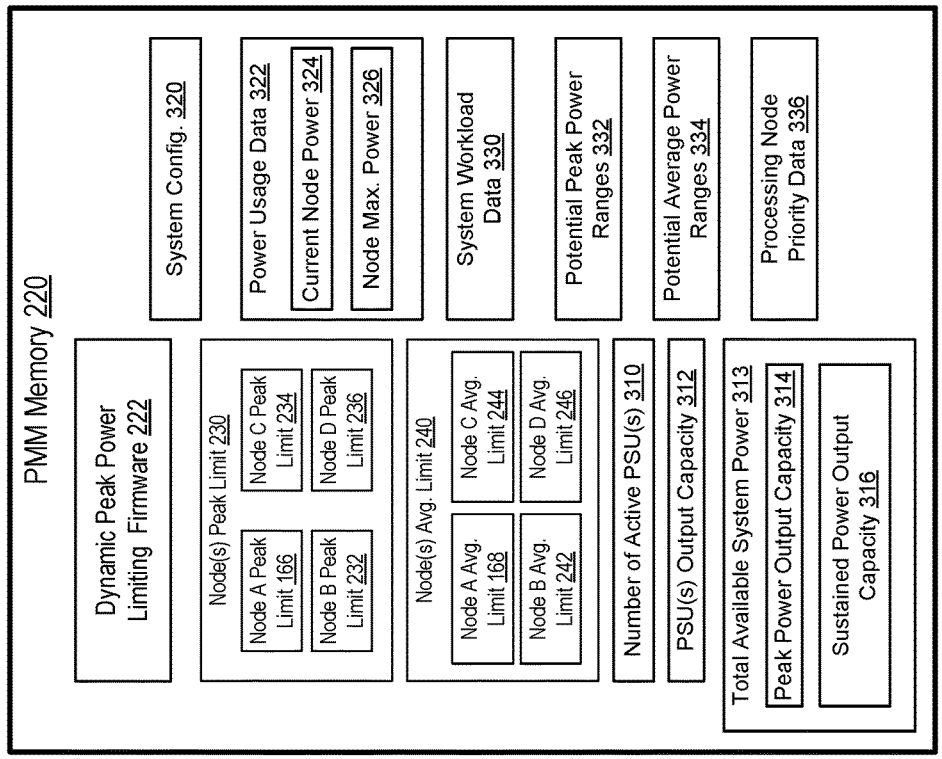
FIG. 3A is a block diagram illustrating example contents of the power management module memory, in accordance with one embodiment.
Figure 3B:
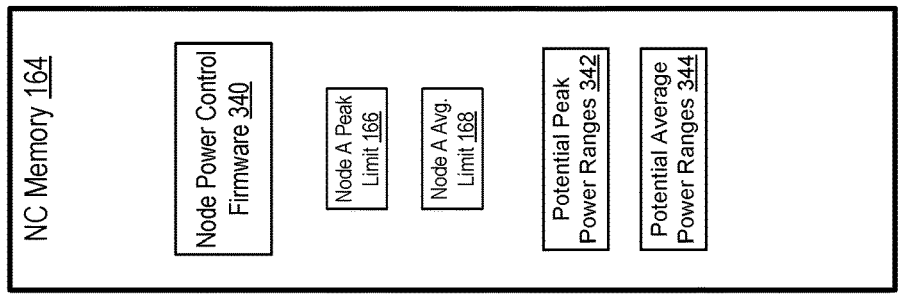
FIG. 3B is a block diagram illustrating example contents of the node controller memory, in accordance with one embodiment.
Figure 3C:
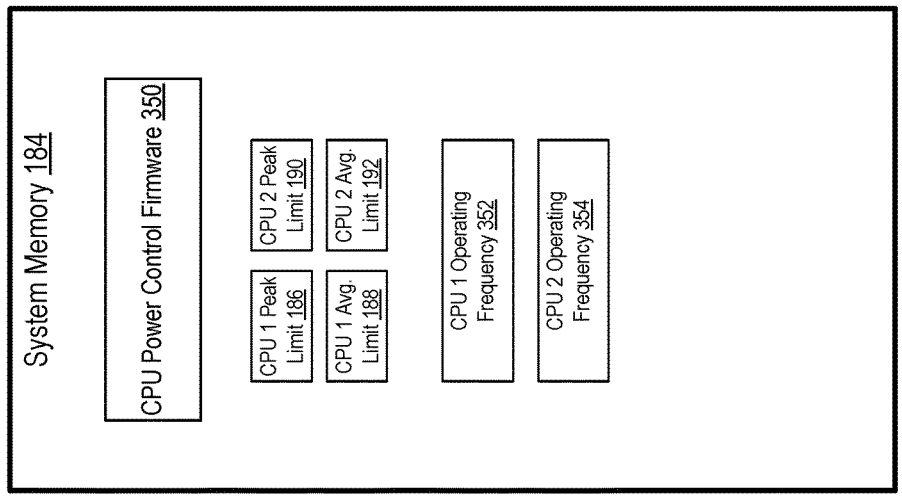
FIG. 3C is a block diagram illustrating examples of the system memory storing CPU power control parameters, in accordance with one embodiment.

FIGS. 3A, 3B and 3C illustrate further details of the contents of PMM memory 220, NC memory 164 and system memory 184. With specific reference to FIG. 3A, PMM memory 220 stores DPPLC firmware 222 which controls the operation of micro-controller 122 in controlling power management functions within IHS 100. PMM memory 220 can store node peak power limits or thresholds 230 and node average power limits or thresholds 240 for each of the processing nodes 150A-D. PMM memory 220 further contains the number of active PSUs 310, the output capacity of each PSU 312, and the total available system power 313 of the IHS, including a peak power output capacity 314 and a sustained output power capacity 316.

PMM memory 220 further stores a system configuration 320 that contains information on IHS 100 such as the number and type of processing nodes 150A-D and the number and type of CPUs including the operating frequencies and power usage of each CPU at each frequency. PMM memory 220 further contains power-usage data 322 such as the current node power 324 being consumed by each of the processing nodes 150A-D and the allowable node maximum power 326 for each of the processing nodes.

PMM memory 220 also stores system workload data 330 that contains information on the current and projected power consumption for each of the processing nodes 150A-D. PMM memory 220 can further store potential peak power ranges 332 and potential average power ranges 334. The potential peak and average power ranges 332 and 334 are received from processing nodes 150A-D and contain a possible range of peak and average power consumption values for processing nodes 150A-D. PMM memory 220 further stores processing node priority data 336 for each of the processing nodes 150A-D. The processing node priority data 336 is received from management controller 110. A user would specify the priority for each of the processing nodes 150A-D such that some processing nodes are allocated a higher power consumption level than other processing nodes. In one embodiment, micro-controller 122 can include the potential peak power range 332, the potential average power range 334, and the processing node priority data 336 in determining the node peak power thresholds 230 and the node average power thresholds 240.

Turning to FIG. 3B, NC memory 164 can store node power control firmware 340 that controls the operation of power management functions within node controller 160 for each of the processing nodes. Node controllers 160A-D, by executing node power control firmware 340, can monitor and control power functions with each processing node 150A-D when triggered by PMM 120. NC memory 164 can further store node peak power limit or threshold 166 and a node average power limit or threshold 168 for a respective processing node. NC memory 164 can further store potential peak power ranges 342 and potential average power ranges 344 for processing node A. The potential peak and average ranges 342 and 344 contain a possible range of peak and average power consumption values for processing node 150A.

Referring to FIG. 3C, system memory 184 can store CPU power control firmware 350, which controls the operation of power management functions within each of the CPUs (i.e. CPU 1 180 and CPU 2 182). CPU 1 180 and CPU 2 182, executing CPU power control firmware 350, can monitor and control power functions within each CPU when triggered by node controller 160 or PMM 120. System memory 184 further stores CPU 1 peak power limit 186 and CPU 1 average power limit 188 for CPU 1 180 and stores CPU 2 peak power limit 190 and a CPU 2 average power limit 192 for CPU 2 182. System memory 184 also stores CPU 1 operating frequency 352 and CPU 2 operating frequency 354.

In one embodiment, PMM 120, executing DPPLC firmware 222, receives power-usage data 322 and workload data 330 from several node controllers 160. The received data 322/330 includes current node power consumption 324 and a current node workload 330 for each processing node 150A-D within the IHS. A total available system power 313 of the IRS is identified, including a peak power output capacity 314 and a sustained output power capacity 316. At least one node peak power threshold 166 is determined based on the power-usage and workload data for each of the processing nodes. The node controllers are triggered to determine and set a central processing unit (CPU) peak power limit 186, 190 for each of several CPUs 180, 182 within each of the processing nodes based on the node peak power threshold. Each of the CPUs dynamically adjusts an operating frequency 352, 354 based on the CPU peak power limit.

FIG. 3C illustrates the embodiment in which system memory stores power control firmware and data values utilized to control the operation of power management functions within a target device (e.g., CPU 180) that is capable of dynamically adjusting a corresponding performance. Similarly, FIGS. 3D-3G illustrates specific power control firmware and data values within example system memory utilized to control the operation of power management functions as can be applied within a NVMe device, a MIC device, a GPU, and a memory device, respectively.

Figure 3E:
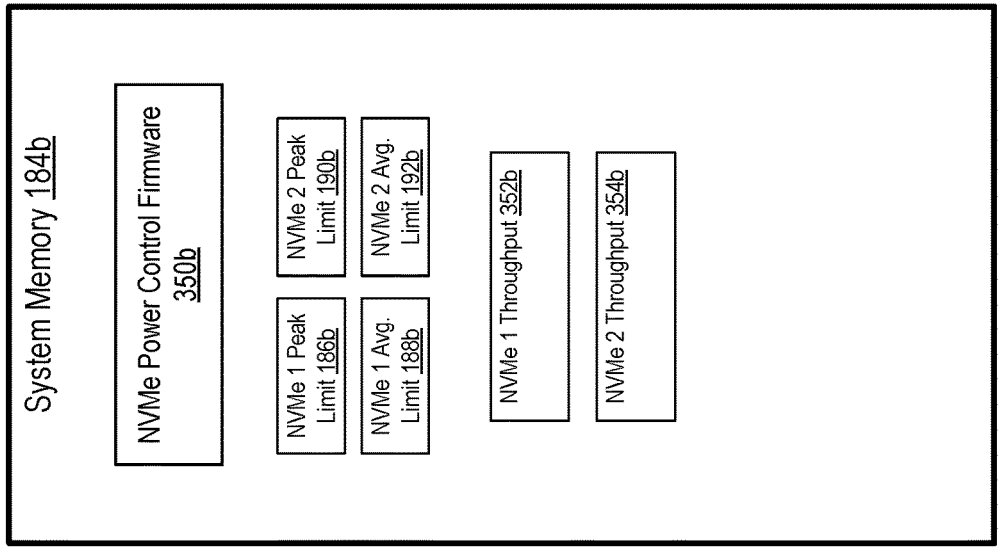
FIG. 3E is a block diagram illustrating examples of the system memory storing NVMe power control parameters, in accordance with one embodiment.
Figure 3D:
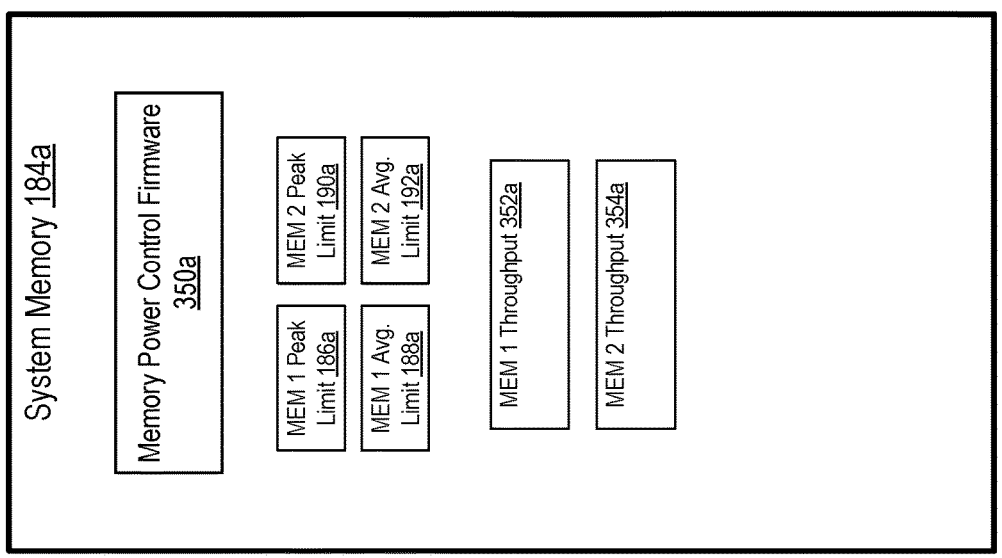
FIG. 3D is a block diagram illustrating examples of the system memory storing memory power control parameters, in accordance with one embodiment.

In FIG. 3D, system memory 184a comprises memory power control firmware 350a. In addition, system memory 184a comprises MEM 1 Peak Limit 186a, MEM 2 Peak Limit 190a, MEM 1 Avg. Limit 188a and MEM 2 Avg. Limit 192a. Additionally, system memory 184a comprises MEM 1 Throughput 352a and MEM 2 Throughput 354a. Node controllers 160A-D can set a device peak power limit (e.g., memory peak limit 186a) for each memory device 184 within each of the processing nodes based on the node peak power threshold. In response to the device peak power limit being set for a corresponding memory device, the memory device dynamically adjusts a value for a corresponding device performance metric, such as data throughput or TOPS, based on the device peak power limit.

In FIG. 3E, system memory 184b comprises NVMe power control firmware 350b. In addition, system memory 184b comprises NVMe 1 Peak Limit 186b, NVMe 2 Peak Limit 190b, NVMe 1 Avg. Limit 188b and NVMe 2 Avg. Limit 192b. Additionally, system memory 184b comprises NVMe 1 Throughput 352b and NVMe 2 Throughput 354b. Node controllers 160A-D can set a device peak power limit (e.g., NVMe 1 Peak limit 186b) for each NVMe device 181, 183 within each of the processing nodes based on the node peak power threshold. In response to the device peak power limit being set for a corresponding NVMe device, the NVMe device dynamically adjusts a value for a corresponding device performance metric, such as data throughput or TOPS, based on the device peak power limit.

Figure 3G:
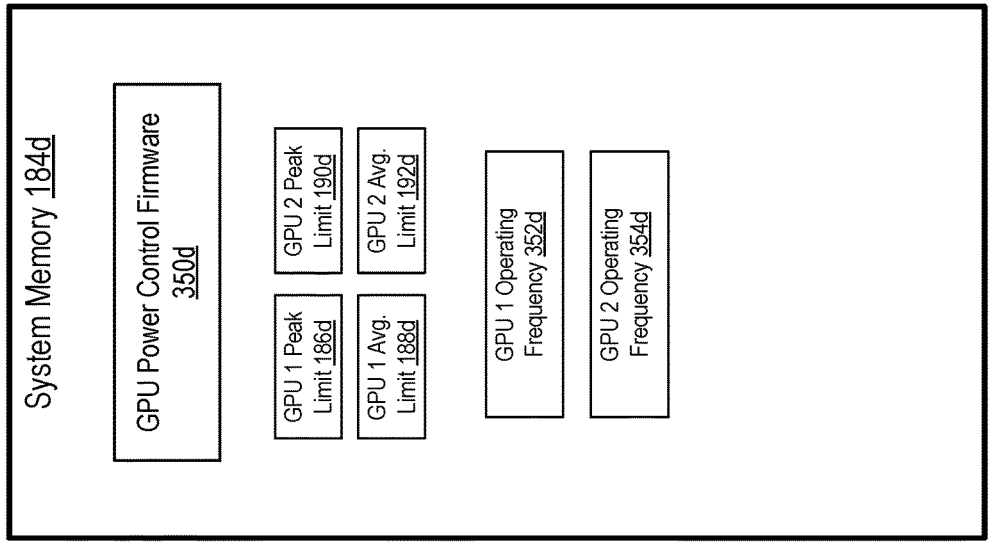
FIG. 3G is a block diagram illustrating examples of the system memory storing GPU power control parameters, in accordance with one embodiment.
Figure 3F:
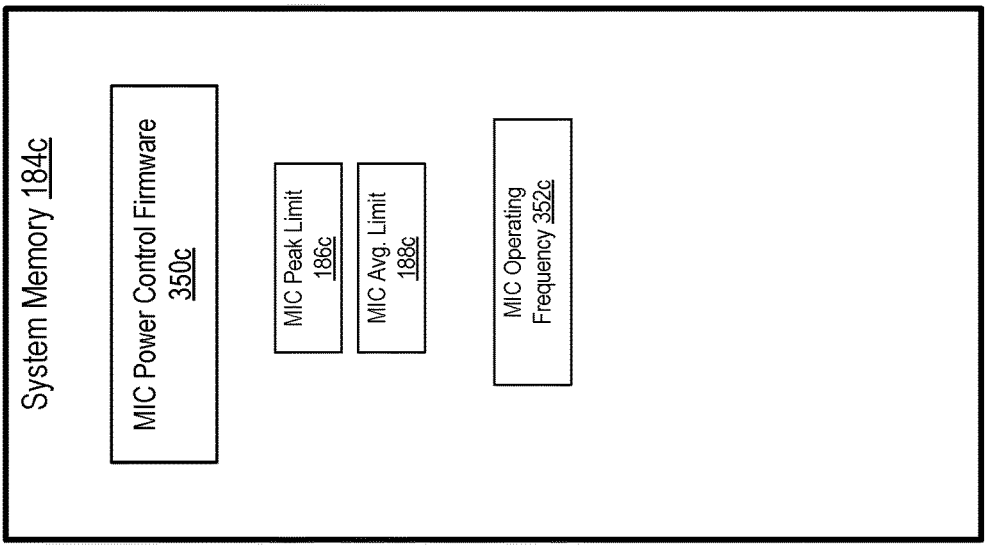
FIG. 3F is a block diagram illustrating examples of the system memory storing MIC power control parameters, in accordance with one embodiment.

In FIG. 3F, system memory 184*c* comprises MIC power control firmware 350*c*. In addition, system memory 184*c* comprises MIC Peak Limit 186*c* and MIC Avg. Limit 188*c*. Additionally, system memory 184*c* comprises MIC Frequency 352*c*. Node controllers 160A-D can set a device peak power limit (e.g., MIC peak limit 186*c*) for each MIC 161 within each of the processing nodes based on the node peak power threshold. In response to the device peak power limit being set for a corresponding MIC, the MIC dynamically adjusts a value for a corresponding device performance metric, such as operating frequency, based on the device peak power limit.

In FIG. 3G, system memory 184*d* comprises GPU power control firmware 350*d*. In addition, system memory 184*d* comprises GPU 1 Peak Limit 186*d*, GPU 2 Peak Limit 190*d*, GPU 1 Avg. Limit 188*d* and GPU 2 Avg. Limit 192*d*. Additionally, system memory 184*d* comprises GPU 1 Frequency 352*d* and GPU 2 Frequency 354*d*. Node controllers 160A-D can set a device peak power limit (e.g., GPU 1 Peak Limit 186*d*) for each GPU 148 within each of the processing nodes based on the node peak power threshold. In response to the device peak power limit being set for a corresponding GPU, the GPU dynamically adjusts a value for a corresponding device performance metric, such as operating frequency, based on the device peak power limit.

FIG. 4A illustrates one example diagram 400 of dynamically allocated peak and sustained node power limits for several processing nodes. PMM 120 (FIG. 1) dynamically allocates peak and sustained node power limits for several processing nodes during operation of IHS 100 based on power-usage and workload data. PMM 120 transmits the peak and sustained power limits to the node controllers 160 (FIG. 1) within each of the processing nodes 150A-D (FIG. 1).

Processing node 150A has node A peak power limit 166 of approximately 680 watts and a node A sustained or average power limit 168 of 500 watts. Processing node 150B has node B peak power limit 232 of approximately 200 watts and a node B sustained or average power limit 242 of 150 watts. Processing node 150C has node C peak power limit 234 of approximately 480 watts and a node C sustained or average power limit 244 of 300 watts. Processing node 150D has node D peak power limit 236 of approximately 300 watts and a node D sustained or average power limit 246 of 230 watts.

FIG. 4B illustrates one example diagram 450 of peak and sustained power capacity for several PSUs 130A-D. FIG. 4B depicts four redundant 2000 watt PSUs that can be used to power IHS 100. PSU peak output capacity can be specified as a ratio to the sustained output capacity. In one embodiment, the peak output capacity can be 150 percent of the sustained output capacity. PSUs 130A-D can maintain the peak output capacity for short periods of time. In FIG. 4B, PSUs 130A and 130B are operational and PSUs 130C and 130D are off line.

PSU 130A has a peak power output capacity 460 of 3000 watts and a sustained power output capacity 462 of 2000 watts. PSU 130B has a peak power output capacity 470 of 3000 watts and a sustained power output capacity 472 of 2000 watts.

Figure 5A:
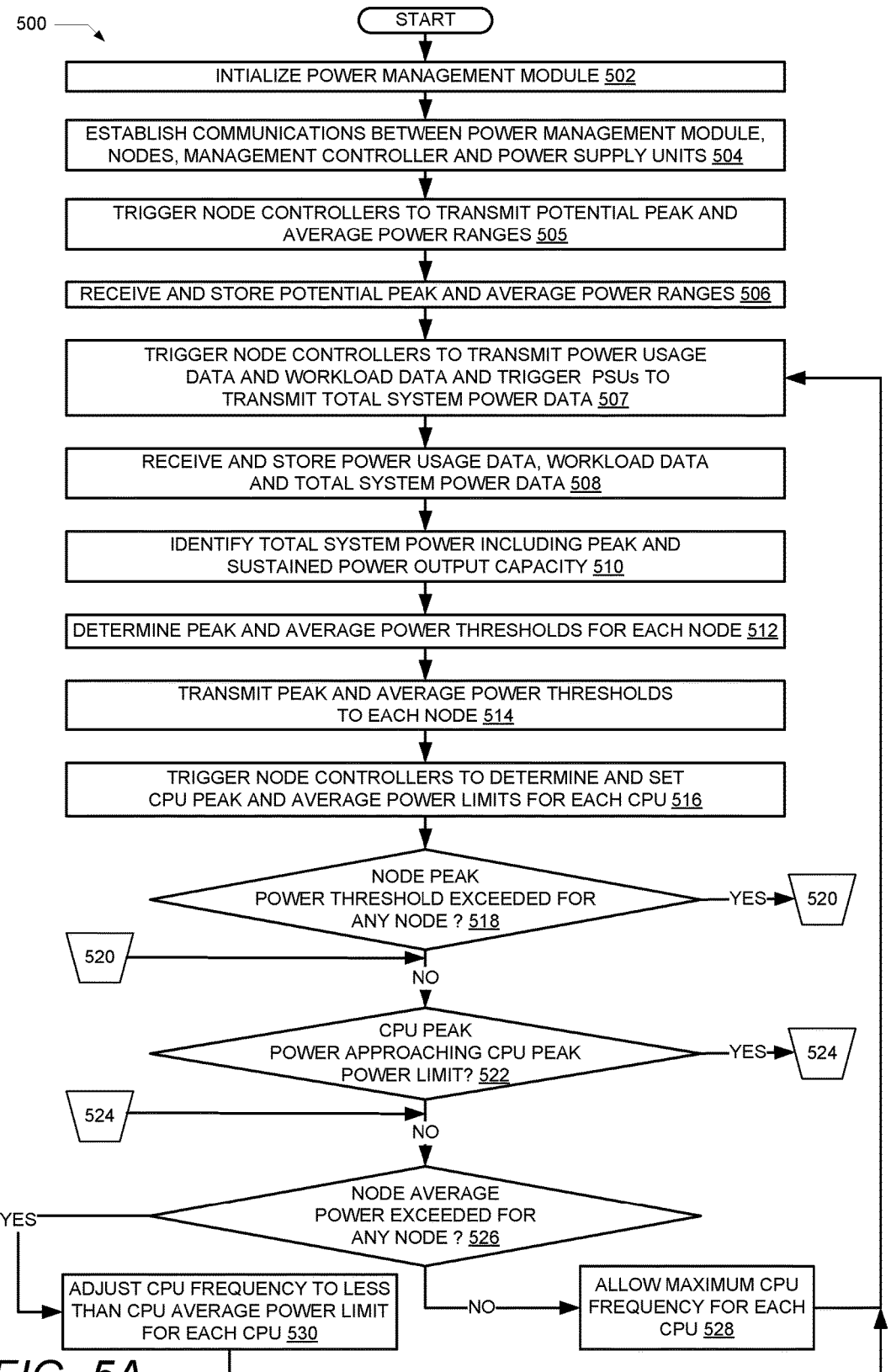
FIG. 5A is a flow chart illustrating one example of the method by which peak power consumption is dynamically limited in processing nodes of the IHS, according to one or more embodiments.
Figure 5B:
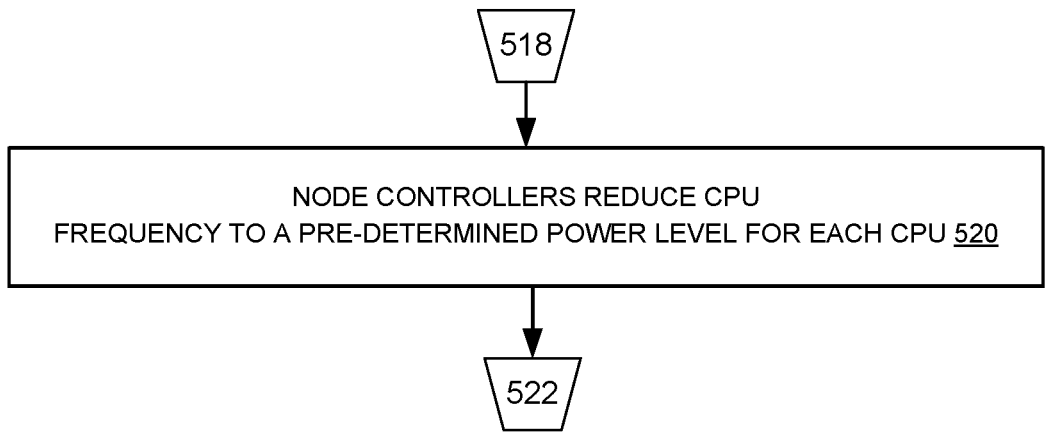
FIG. 5B is a continuation of the flowchart of FIG. 5A illustrating one example of the method by which CPU frequency is reduced in a processing node in the event that the node power threshold is exceeded for the processing node, according to one or more embodiments.
Figure 5C:
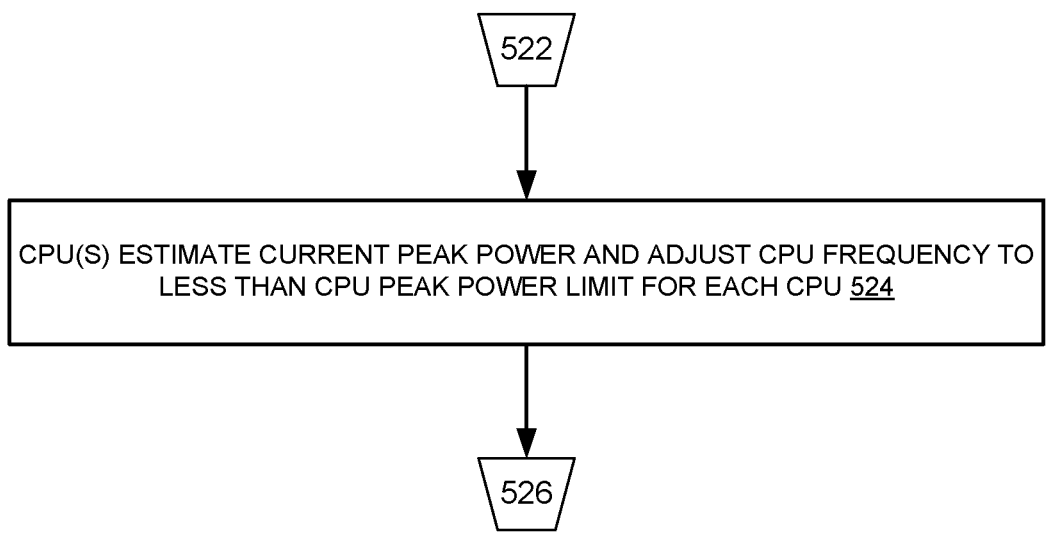
FIG. 5C is a continuation of the flowchart of FIG. 5A illustrating one example of the method by which CPU frequency is adjusted in the event that the CPU peak power limit is being approached, according to one or more embodiments.

FIGS. 5A-5C illustrate a flowchart of an exemplary method 500 by which micro-controller 122 within the preceding figures performs different aspects of the processes that enable the one or more embodiments of the disclosure. Generally, method 500 represents a computer-implemented method. The description of method 500 is provided with general reference to the specific components illustrated within the preceding FIGS. 1-4B. Generally method 500 is described as being implemented via micro-controller 122 and particularly the execution of code provided by DPPLC firmware 222 within micro-controller 122. The execution of this DPPLC firmware 222 results in the implementation of dynamic peak power limiting to processing nodes 150A-D in IHS 100. It is however appreciated that certain aspects of the described methods may be implemented via other processing devices and/or execution of other code.

With specific reference to FIG. 5A, method 500 begins at the start block and proceeds to block 502 where PMM 120 is initialized. The initialization of PMM 120 includes micro-controller 122 loading DPPLC firmware 222 and system configuration 320 from PMM memory 220. At block 504, micro-controller 122 establishes communications with management controller 120, PSUs 130A-D and processing nodes 150A-D. Micro-controller 122 triggers the node controllers 160A-D to transmit the potential peak power ranges 332 and potential average power ranges 334 to micro-controller 122 (block 505). At block 506, micro-controller 122 receives and stores the potential peak power ranges 332 and potential average power ranges 334 to PMM memory 220. The node controllers 160A-D track the power-usage data 322 and workload data 330 for each of the processing nodes, and micro-controller 122 triggers the node controllers 160A-D to transmit the tracked power-usage data and workload data from the node controllers 160A-D to micro-controller 122 (block 507). Also at block 507, micro-controller 122 triggers the PSUs 130A-D to transmit the total available system power 313 to micro-controller 122.

Micro-controller 122 receives the power usage data 322 and workload data 330 for each of the processing nodes 150A-D and the total available system power 313 and stores the power usage data, the workload data, and the total system power data to PMM memory 220 (block 508). At block 510, micro-controller 122 identifies the total available system power 313, including peak power output capacity 314, and sustained power output capacity 316.

Micro-controller 122 determines the node peak power limits or thresholds 230 (i.e. node peak limits 166, 232, 234 and 236) and the node average power limits or thresholds 240 (i.e. node average limits 168, 242, 244 and 246) for each of the processing nodes based on the power-usage data and workload data, and micro-controller 122 stores the node peak power limits or thresholds 230 and the node average power limits or thresholds 240 in PMM memory 220 (block 512). At block 514, micro-controller 122 transmits the respective node peak power limit or threshold 230 and the respective node average power limit or threshold 240 to the respective processing nodes 150A-D where the respective node peak power limit or threshold 230 and the respective node average power limit or threshold 240 are stored in NC memory 164.

Micro-controller 122 triggers the node controllers 160A-D to determine and set a CPU peak power limit 186, 190 based on the node peak power thresholds 230 and a CPU average power limit 188, 192 based on the node average power thresholds 240 for each CPU (i.e. CPU 1 180 and CPU 2 182) within each respective processing node (block 516). The CPU peak power limits 186, 190 and CPU average power limits 188, 192 are stored to system memory 184. In one embodiment, node controllers 160A-D, executing node power control firmware 340, determines and sets the CPU peak power limits and the CPU average power limits for each CPU with each of the processing nodes 150A-D. The device peak power limit restricts/limits the dynamic performance range within which the device performance is adjusted to (maximally) enforce/satisfy the average power limit.

At decision block 518, node controllers 160A-D determine if the node peak power limits or thresholds 230 have been exceeded for each of the processing nodes. In response to the node peak power limits or thresholds 230 having been exceeded for one or more of the processing nodes, the node controllers 160A-D instantaneously reduce the operating frequency of the CPUs (i.e. CPU 1 180, CPU 2 182) within that processing node to a pre-determined power level (block 520).

After block 520 and in response to the node peak power limits or thresholds 230 not being exceeded for one or more of the processing nodes at decision step 518, each of the CPUs (i.e. CPU 1 180, CPU 2 182), running CPU power control firmware 350, determines if the current CPU peak power consumption is approaching the CPU peak power limits (i.e. CPU 1 peak limit 186, CPU 2 peak limit 190) for at least one of the CPUs (decision block 522).

In response to determining that the current CPU peak power consumption is approaching the CPU peak power limits, the corresponding CPU (i.e. CPU 1 180, CPU 2 182) estimates a current peak power level based on the workload data 330 and adjusts the operating frequency (i.e. CPU 1 operating frequency 352, CPU 2 operating frequency 354) of the CPU such that the current peak power level remains less than the CPU peak power limits 186, 190 (block 524).

After step 524 and in response to the current CPU peak power consumption not approaching the CPU peak power limits (i.e. CPU 1 peak limit 186, CPU 2 peak limit 190) for at least one of the CPUs at decision block 522, The CPUs (i.e. CPU 1 180 and CPU 2 182) determine if a current node average power consumption has exceeded the node average power limit or threshold 240 for at least one of the processing nodes 150A-D (decision block 526).

In response to determining that the current node average power consumption has exceeded the node average power threshold 240 for at least one of the processing nodes, each corresponding CPU adjusts the operating frequency of the CPU such that the current average CPU power level is less than the CPU average power limit (i.e. CPU 1 average limit 188, CPU 2 average limit 192) (block 530). Method 500 then returns to block 507 where micro-controller 122 triggers the node controllers 160A-D to again transmit the tracked power-usage data and workload data.

In response to determining that the current node average power consumption has not exceeded the node average power threshold 240 for at least one of the processing nodes, the CPUs within that processing node allow operation at a maximum allowable frequency (block 528). Method 500 then returns to block 507 where micro-controller 122 triggers the node controllers 160A-D to again transmit the tracked power-usage data and workload data.

FIGS. 5D-5G illustrate flowcharts of exemplary methods 540, 550, 560, and 570 by which micro-controller 122 within the preceding figures performs different aspects of the processes that enable one or more embodiments of the disclosure. Each method 540, 550, 560, and 570 extends the functionality of the above-described CPU-based implementation to the other example variable performance devices within an IHS, as illustrated by FIGS. 1B-1D. Implementation of the above features involves the use of specific firmware and variables presented by FIGS. 3D-3G for the respective variable performance device. The flow charts are to be read as a continuation of blocks 502-514 in the preceding FIG. 5A flow chart. For simplicity, the flowcharts are described individually herein, as separate, discrete processes occurring within respective (different) configurations of IHS s. However, it is appreciated that the processes can be executed in parallel (or concurrently) with each other, where a single IHS supports and/or or is configured with multiple different types of variable performance devices, in one embodiment.

Figure 5D:
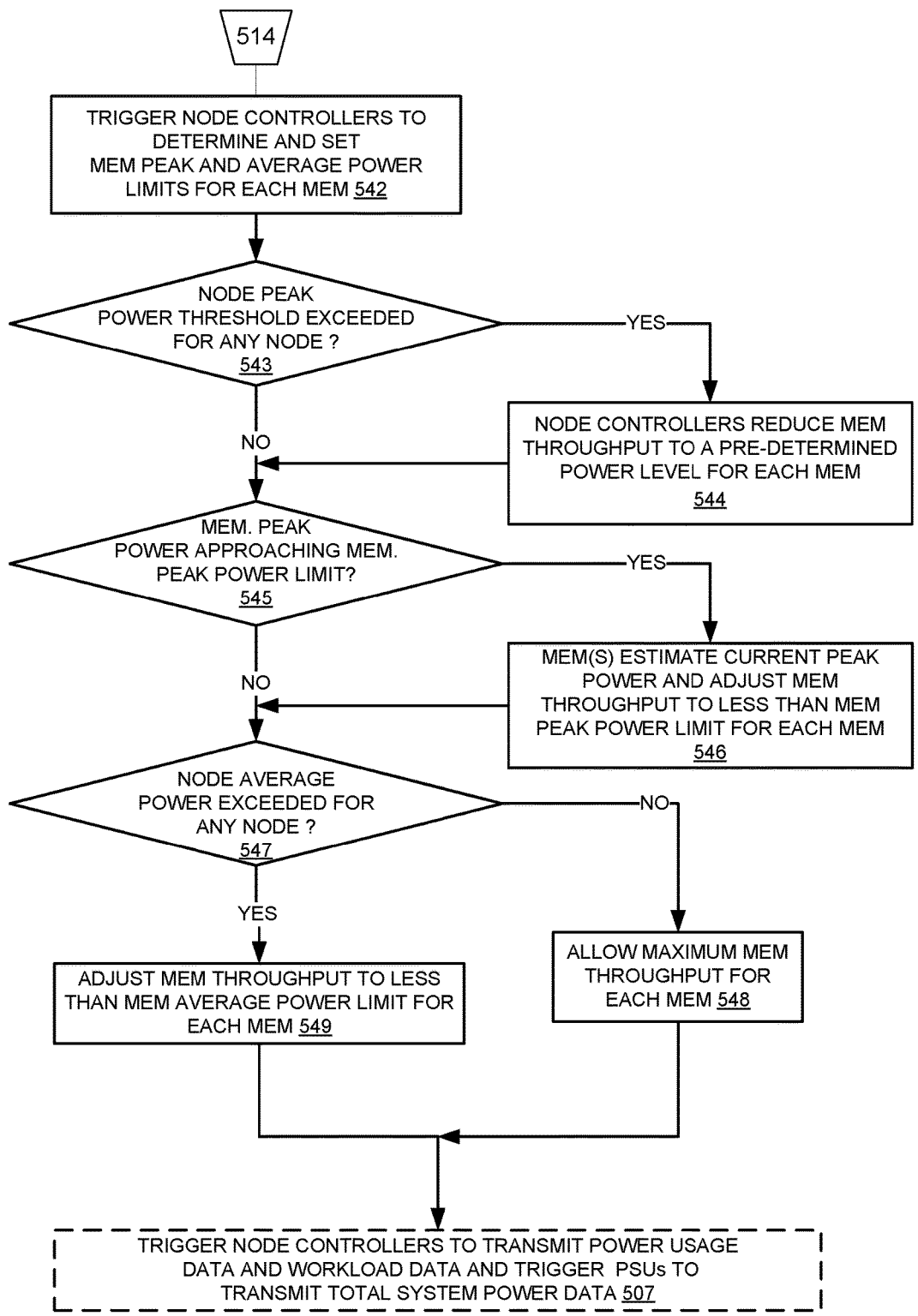
FIG. 5D is a flowchart illustrating one example of the method by which memory throughput is adjusted in the event that the memory peak power limit is being approached, according to one or more embodiments.

Beginning with FIG. 5D, method 540 continues from block 514 of method 500 and proceeds to block 542. At block 542, Micro-controller 122 triggers the node controllers 160A-D to determine and set an memory (MEM) peak power limit 186*a*, 190*a* based on the node peak power thresholds 230 and an MEM average power limit 188*a*, 192*a* based on the node average power thresholds 240 for each MEM (e.g., MEM 184) within each respective processing node. At decision block 543, node controllers 160A-D determine if the node peak power limits or thresholds 230 have been exceeded for each of the processing nodes. In response to the node peak power limits or thresholds 230 having been exceeded for one or more of the processing nodes, the node controllers 160A-D instantaneously reduce the data throughput of the MEMs (e.g., MEM 184) within that processing node to a pre-determined power level (block 544).

After block 544 and in response to the node peak power limits or thresholds 230 not being exceeded for one or more of the processing nodes at decision step 543, each of the MEMs (e.g., MEM 184), running MEM power control firmware 350, determines if the current MEM peak power consumption is approaching the MEM peak power limits (i.e. MEM 1 peak limit 186*a*, MEM 2 peak limit 190*a*) for at least one of the MEMs (decision block 545).

In response to determining that the current MEM peak power consumption is approaching the MEM peak power limits, the corresponding MEM (e.g., MEM 184) estimates a current peak power level based on the workload data 330 and adjusts the data throughput (i.e. MEM 1 data throughput 352*a*, MEM 2 data throughput 354*a*) of the MEM such that the current peak power level remains less than the MEM peak power limits 186*a*, 190*a* (block 546).

After step 546 and in response to the current MEM peak power consumption not approaching the MEM peak power limits (i.e. MEM 1 peak limit 186*a*, MEM 2 peak limit 190*a*) for at least one of the MEM s at decision block 545, the MEMs (e.g., MEM 184) determine if a current node average power consumption has exceeded the node average power limit or threshold 240 for at least one of the processing nodes 150A-D (decision block 547).

In response to determining that the current node average power consumption has exceeded the node average power threshold 240 for at least one of the processing nodes, each corresponding MEM adjusts the data throughput of the MEM such that the current average MEM power level is less than the MEM average power limit (i.e., MEM 1 average limit 188*a*, MEM 2 average limit 192*a*) (block 549). Method 540 then returns to block 507 where micro-controller 122 triggers the node controllers 160A-D to again transmit the tracked power-usage data and workload data.

In response to determining that the current node average power consumption has not exceeded the node average power threshold 240 for at least one of the processing nodes, the MEMs within that processing node allow operation at a maximum allowable throughput (block 548). Method 540 then returns to block 507 of method 500 where microcontroller 122 triggers the node controllers 160A-D to again transmit the tracked power-usage data and workload data.

Figure 5E:
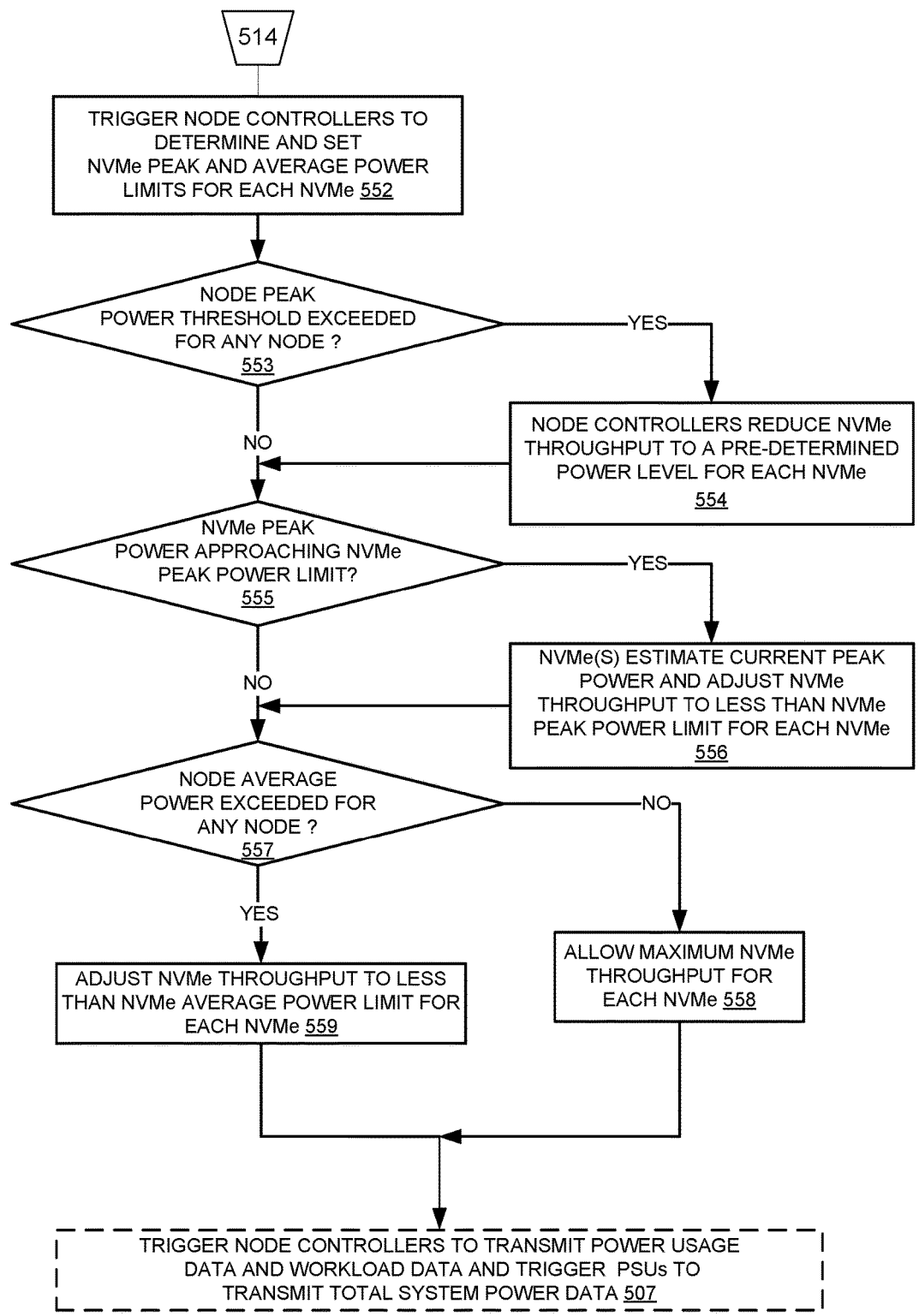
FIG. 5E is a flowchart illustrating one example of the method by which NVMe throughput is adjusted in the event that the NVMe peak power limit is being approached, according to one or more embodiments.

Turning now to FIG. 5E, method 550 continues from block 514 of method 500 and proceeds to block 552. At block 552, Micro-controller 122 triggers the node controllers 160A-D to determine and set an NVMe peak power limit 186b, 190b based on the node peak power thresholds 230 and an NVMe average power limit 188b, 192b based on the node average power thresholds 240 for each NVMe (i.e., NVMe 1 181 and NVMe 2 183) within each respective processing node. At decision block 553, node controllers 160A-D determine if the node peak power limits or thresholds 230 have been exceeded for each of the processing nodes. In response to the node peak power limits or thresholds 230 having been exceeded for one or more of the processing nodes, the node controllers 160A-D instantaneously reduce the data throughput of the NVMes (i.e., NVMe 1 181, NVMe 2 183) within that processing node to a pre-determined power level (block 554).

After block 554 and in response to the node peak power limits or thresholds 230 not being exceeded for one or more of the processing nodes at decision step 553, each of the NVMes (i.e., NVMe 1 181, NVMe 2 183), running NVMe power control firmware 350, determines if the current NVMe peak power consumption is approaching the NVMe peak power limits (i.e. NVMe 1 peak limit 186b, NVMe 2 peak limit 190b) for at least one of the NVMes (decision block 555).

In response to determining that the current NVMe peak power consumption is approaching the NVMe peak power limits, the corresponding NVMe (i.e., NVMe 1 181, NVMe 2 183) estimates a current peak power level based on the workload data 330 and adjusts the data throughput (i.e., NVMe 1 data throughput 352b, NVMe 2 data throughput 354b) of the NVMe such that the current peak power level remains less than the NVMe peak power limits 186b, 190b (block 556).

After step 556 and in response to the current NVMe peak power consumption not approaching the NVMe peak power limits (i.e. NVMe 1 peak limit 186b, NVMe 2 peak limit 190b) for at least one of the NVMes at decision block 555, the NVMes (i.e., NVMe 1 181, NVMe 2 183) determine if a current node average power consumption has exceeded the node average power limit or threshold 240 for at least one of the processing nodes 150A-D (decision block 557).

In response to determining that the current node average power consumption has exceeded the node average power threshold 240 for at least one of the processing nodes, each corresponding NVMe adjusts the data throughput of the NVMe such that the current average NVMe power level is less than the NVMe average power limit (i.e. NVMe 1 average limit 188b, NVMe 2 average limit 192b) (block 559). Method 550 then returns to block 507 where microcontroller 122 triggers the node controllers 160A-D to again transmit the tracked power-usage data and workload data.

In response to determining that the current node average power consumption has not exceeded the node average power threshold 240 for at least one of the processing nodes, the NVMes within that processing node allow operation at a maximum allowable throughput (block 558). Method 550 then returns to block 507 of method 500 where microcontroller 122 triggers the node controllers 160A-D to again transmit the tracked power-usage data and workload data.

Figure 5F:
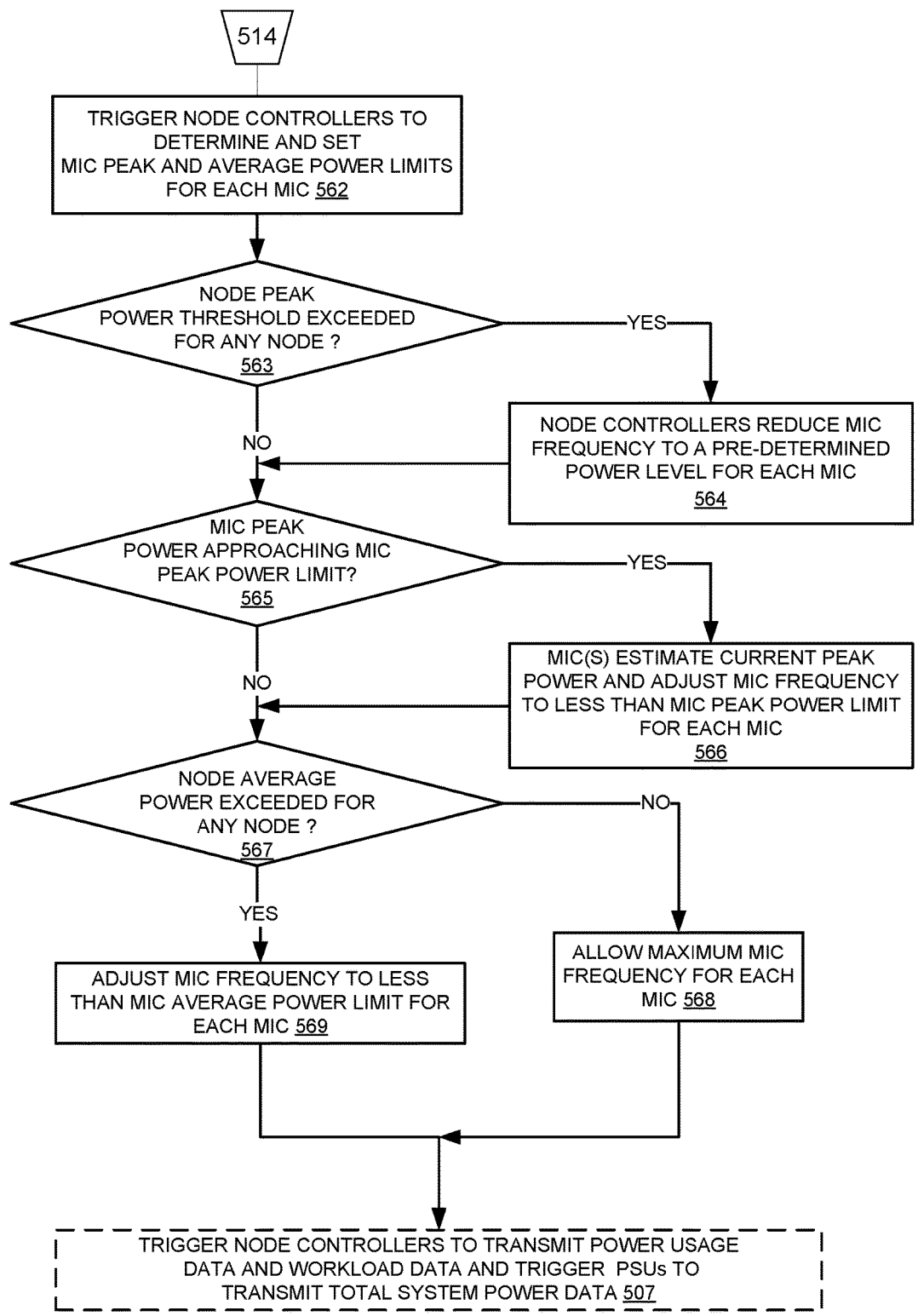
FIG. 5F is a flowchart illustrating one example of the method by which MIC frequency is adjusted in the event that the MIC peak power limit is being approached, according to one or more embodiments.

FIG. 5F illustrates that method 560 continues from block 514 of method 500 and proceeds to block 562. At block 562, Micro-controller 122 triggers the node controllers 160A-D to determine and set an MIC peak power limit 186c based on the node peak power thresholds 230 and a MIC average power limit 188c based on the node average power thresholds 240 for each MIC 161 within each respective processing node. At decision block 543, node controllers 160A-D determine if the node peak power limits or thresholds 230 have been exceeded for each of the processing nodes. In response to the node peak power limits or thresholds 230 having been exceeded for one or more of the processing nodes, the node controllers 160A-D instantaneously reduce the operating frequency of the MICs (e.g., MIC 161) within that processing node to a pre-determined power level (block 564).

After block 564 and in response to the node peak power limits or thresholds 230 not being exceeded for one or more of the processing nodes at decision step 563, each of the MICs (e.g., MIC 161), running MIC power control firmware 350c, determines if the current MIC peak power consumption is approaching the MIC peak power limits (e.g., MIC peak limit 186c) for at least one of the MICs (decision block 565).

In response to determining that the current MIC peak power consumption is approaching the MIC peak power limits, the corresponding MIC (e.g., MIC 161) estimates a current peak power level based on the workload data 330 and adjusts the operating frequency (e.g., MIC operating frequency 352c) of the MIC such that the current peak power level remains less than the MIC peak power limit 186c (block 566).

After step 566 and in response to the current MIC peak power consumption not approaching the MIC peak power limits (e.g., MIC peak limit 186c) for at least one of the MICs at decision block 565, the MICs (e.g., MIC 161) determine if a current node average power consumption has exceeded the node average power limit or threshold 240 for at least one of the processing nodes 150A-D (decision block 567).

In response to determining that the current node average power consumption has exceeded the node average power threshold 240 for at least one of the processing nodes, each corresponding MIC adjusts the operating frequency of the MIC such that the current average MIC power level is less than the MIC average power limit (e.g., MIC average limit 188c) (block 569). Method 560 then returns to block 507 where micro-controller 122 triggers the node controllers 160A-D to again transmit the tracked power-usage data and workload data.

In response to determining that the current node average power consumption has not exceeded the node average power threshold 240 for at least one of the processing nodes, the MICs within that processing node allow operation at a maximum allowable frequency (block 568). Method 560 then returns to block 507 of method 500 where microcontroller 122 triggers the node controllers 160A-D to again transmit the tracked power-usage data and workload data.

Figure 5G:
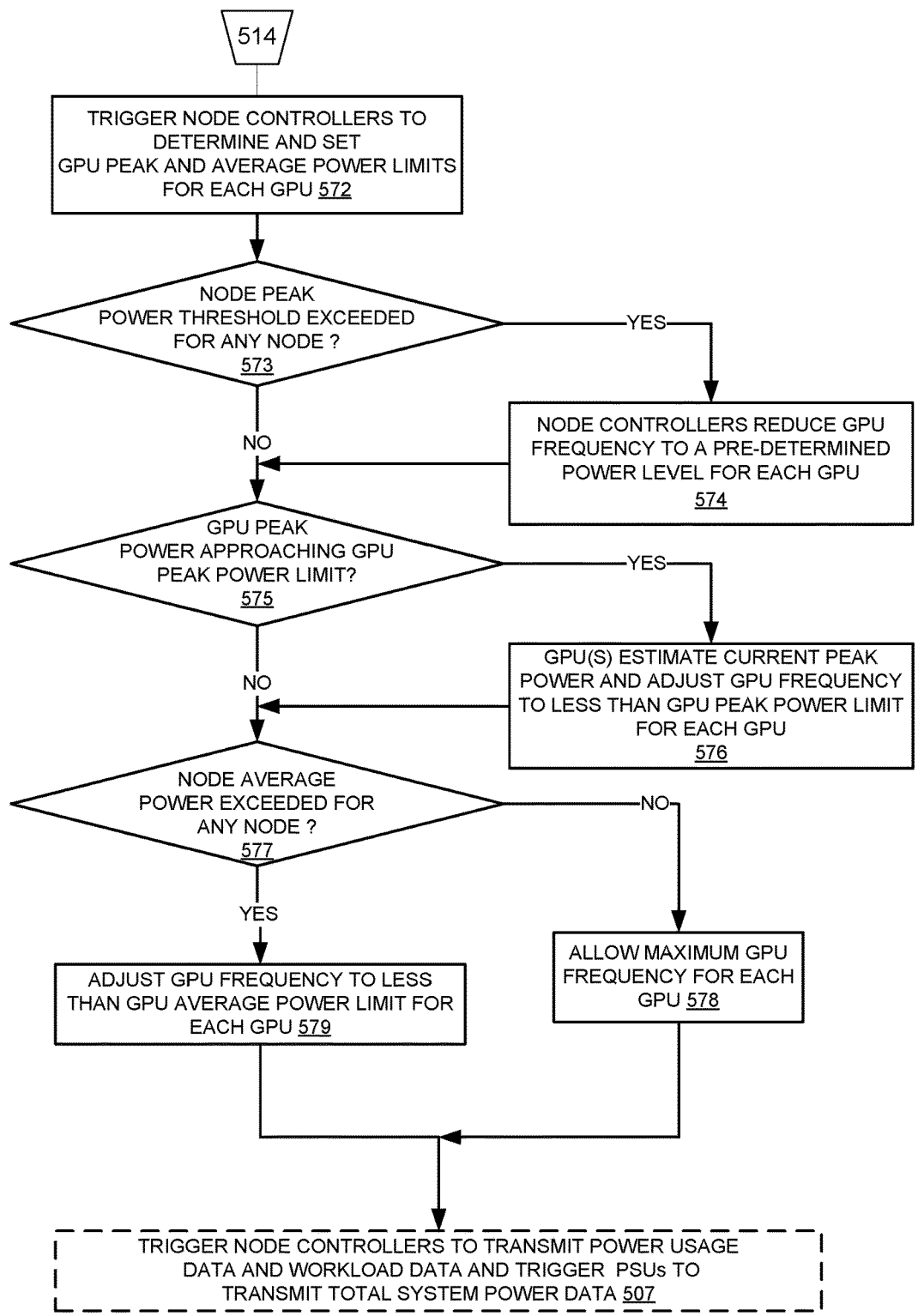
FIG. 5G is a flowchart illustrating one example of the method by which GPU frequency is adjusted in the event that the GPU peak power limit is being approached, according to one or more embodiments.

Finally, in FIG. 5G, method 570 continues from block 514 of method 500 and proceeds to block 572. At block 572, Micro-controller 122 triggers the node controllers 160A-D to determine and set a GPU peak power limit 186d, 190d based on the node peak power thresholds 230 and a GPU average power limit 188d, 192d based on the node average power thresholds 240 for each GPU 180d within each respective processing node. At decision block 573, node controllers 160A-D determine if the node peak power limits or thresholds 230 have been exceeded for each of the processing nodes. In response to the node peak power limits or thresholds 230 having been exceeded for one or more of the processing nodes, the node controllers 160A-D instantaneously reduce the operating frequency of the GPUs (e.g., GPU 148) coupled to that processing node to a pre-determined power level (block 574).

After block 574 and in response to the node peak power limits or thresholds 230 not being exceeded for one or more of the processing nodes at decision step 573, each of the GPUs (e.g., GPU 148), running GPU power control firmware 350*d*, determines if the current GPU peak power consumption is approaching the GPU peak power limits (e.g., GPU peak limit 186*d*) for at least one of the GPUs (decision block 575).

In response to determining that the current GPU peak power consumption is approaching the GPU peak power limits, the corresponding GPU (e.g., GPU 148) estimates a current peak power level based on the workload data 330 and adjusts the operating frequency (e.g., GPU operating frequency 352*d*) of the GPU such that the current peak power level remains less than the GPU peak power limit 186*d* (block 576).

After step 576 and in response to the current GPU peak power consumption not approaching the GPU peak power limits (e.g., GPU peak limit 186*d*) for at least one of the GPU s at decision block 575, the GPUs (e.g., GPU 148) determine if a current node average power consumption has exceeded the node average power limit or threshold 240 for at least one of the processing nodes 150A-D (decision block 577).

In response to determining that the current node average power consumption has exceeded the node average power threshold 240 for at least one of the processing nodes, each corresponding GPU adjusts the operating frequency of the GPU such that the current average GPU power level is less than the GPU average power limit (e.g., GPU average limit 188*d*) (block 579). Method 570 then returns to block 507 where micro-controller 122 triggers the node controllers 160A-D to again transmit the tracked power-usage data and workload data.

In response to determining that the current node average power consumption has not exceeded the node average power threshold 240 for at least one of the processing nodes, the GPUs within that processing node allow operation at a maximum allowable frequency (block 578). Method 570 then returns to block 507 of method 500 where micro-controller 122 triggers the node controllers 160A-D to again transmit the tracked power-usage data and workload data.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method to dynamically limit peak power consumption in processing nodes of an information handling system (IHS), the method comprising:

receiving, at a power management micro-controller (PMM), a plurality of processing node-level power-usage and workload data from a plurality of node controllers, including a current power consumption and a current workload, for each processing node within the IHS, wherein each of the processing nodes has a complex programmable logic device (CPLD) and a board management controller (BMC), the CPLD coupled to the PMM via an I2C bus, and the BMC coupled to the PMM via an Ethernet cable, the PMM providing control and/or management signals to the processing nodes via the I2C bus and one or more select wires within the Ethernet cable;

identifying a total available system power of the IHS including a peak power output capacity and a sustained output power capacity;

receiving a processing node priority data from a management controller (MC) that is communicatively coupled to each of the plurality of node controllers of the processing nodes;

storing the priority data to PMM memory;

determining, by the micro-controller, at least one node peak power threshold based on the power-usage and workload data for each of the processing nodes and in part based on the processing node priority data;

determining, by the micro-controller, at least one node average power threshold based on the power-usage and workload data for each of the processing nodes and in part based on the processing node priority data;

transmitting the node peak power threshold and the node average power threshold to the node controllers of each of the processing nodes;

triggering the node controllers to determine and set a device peak power limit for each of a plurality of respective variable performance devices located within or associated with each of the processing nodes based on the node peak power threshold;

triggering each of the plurality of node controllers to determine and set a respective device average power limit for each of the plurality of respective variable performance devices associated with each of the processing nodes based on a respective node average power threshold;

wherein each of the plurality of respective variable performance devices concurrently adjusts a corresponding device performance metric, from among an operating frequency and a data throughput, that applies to a respective one of the variable performance devices, based on the average power limit and a peak power limit of the respective device;

wherein each of the respective variable performance level devices dynamically adjusts, based on the device peak power limit, the corresponding device performance metric, in order for a current peak power level to remain within or less than the device peak power limit;

storing the at least one node peak power threshold and at least one average power threshold in node controller memory;

determining if a current device peak power consumption is approaching the device peak power limit for at least one of the devices; and in response to determining that the current device peak power consumption is approaching the device peak power limit, the corresponding device estimating its current peak power level based on the workload data and adjusting the at least one of the operating frequency and the data throughput of the corresponding device such that the current peak power level remains less than the device peak power limit.

2. The method of claim 1, wherein the plurality of devices comprise one or more non-volatile memory express (NVMe) devices, and the method further comprises:

triggering the node controllers to determine and set an NVMe average power limit for each of the NVMe devices within each of the processing nodes based on a node average power threshold;

wherein each of the NVMe devices adjusts a data throughput based on the device peak power limit; and wherein the device peak power limit restricts a dynamic performance range within which a device performance is adjusted to maximally enforce or satisfy the average power limit.

3. The method of claim 1, wherein the plurality of devices comprise one or more memory devices, and the method further comprises:

triggering the node controllers to determine and set a memory average power limit for each of the memory devices within each of the processing nodes based on a node average power threshold;

wherein each of the memory devices adjusts a data throughput based on the device peak power limit.

4. The method of claim 1, wherein the plurality of devices comprise one or more many integrated cores (MICs), and the method further comprises:
triggering the node controllers to determine and set an MIC average power limit for each of the MICs within each of the processing nodes based on a node average power threshold;
wherein each of the MICs adjusts an operating frequency based on the device peak power limit.

5. The method of claim 1, wherein the plurality of devices comprise one or more GPUs, and the method further comprises:
triggering the node controllers to determine and set a GPU average power limit for each of the GPUs associated with each of the processing nodes based on a node average power threshold;
wherein each of the GPUs adjusts an operating frequency based on the device peak power limit.

6. The method of claim 1, wherein the plurality of devices comprise at least two devices from among (a) a CPU, (b) an NVMe device, (c) a memory device, (d) a MIC, and (e) a GPU.

7. The method of claim 1, further comprising:
initializing the power management micro-controller during start-up configuration of the IHS;
establishing communication between the power management micro-controller, power supply units and the node controllers;
tracking, via the node controllers, the processing node power-usage and workload data for each of the processing nodes; and
triggering the node controllers to transmit the power-usage and workload data to the power management micro-controller;
receiving at the power management micro-controller, a potential peak power range and a potential average power range from the processing nodes.

8. The method of claim 1, further comprising:
determining if the node peak power threshold has been exceeded for at least one of the processing nodes; and
in response to determining that the node peak power threshold has been exceeded for at least one of the processing nodes, concurrently reducing the at least one of the operating frequency and the data throughput of the respective devices associated with that processing node to a predetermined power level.

9. The method of claim 8, wherein determining if the current device peak power consumption is approaching the device peak power limit for at least one of the devices is performed in response to determining that the node peak power threshold has not been exceeded for at least one of the processing nodes.

10. The method of claim 9, further comprising:
in response to determining that the current device peak power consumption is not approaching the device peak power limit, determining if a current node average power consumption has exceeded a node average power threshold for at least one of the processing nodes; and
in response to determining that the current node average power consumption has exceeded the node average power threshold for at least one of the processing nodes, each corresponding device adjusting the at least one of the operating frequency and the data throughput of the respective device such that the current average device power level is less than the device average power limit.

11. The method of claim 10, further comprising:
in response to determining that the current node average power consumption has not exceeded the node average power threshold for at least one of the processing nodes, allowing the devices associated with that processing node to respectively operate at one of a maximum allowable frequency and maximum allowable throughput.

12. The method of claim 1, wherein:
the node controllers further include node power control firmware that execute on the node controllers to enable each of the node controllers to determine and set the device peak power limit; and
the devices further include device power control firmware that execute on the devices to enable each of the devices to dynamically adjust the at least one of the operating frequency and the data throughput of the respective device based on the device peak power limit.

13. An information handling system (IHS) comprising:
one or more processing nodes, each of the processing nodes having at least one node controller, the node controllers each controlling node-level operations of the processing nodes within a corresponding node, the processing nodes each having at least one central processing unit (CPU) communicatively coupled to the node controller;
one or more variable performance level devices communicatively coupled to the node controller and having a performance level based on a value of a corresponding device performance metric;
a power management module having a power management micro-controller and a memory coupled to the power management micro-controller, the power management module communicatively coupled to the processing nodes, wherein each of the processing nodes has a complex programmable logic device (CPLD) and a board management controller (BMC), the CPLD coupled to the PMM via an I2C bus, and the BMC coupled to the PMM via an Ethernet cable, where the PMM provides control and/or management signals to the processing nodes via the I2C bus and one or more select wires within the Ethernet cable;
a power subsystem communicatively coupled to the power management micro-controller and providing power distribution to the IHS, the power subsystem including at least one power supply unit (PSU); and
the power management micro-controller having firmware executing thereon to enable dynamic peak power limiting to the processing nodes within the IHS, wherein the firmware configures the power management micro-controller to:
receive a plurality of processing node-level power-usage and workload data from the node controllers, including a current power consumption and a current workload, for each processing node within the IHS;
identify a total available system power of the IHS including a peak power output capacity and a sustained output power capacity;
receiving a processing node priority data from a management controller (MC) that is communicatively couples to the processing nodes;
storing the priority data to PMM memory;
determine at least one node peak power threshold based on the power-usage and workload data for each of the processing nodes and in part based on the processing node priority data;
determine at least one node average power threshold based on the power-usage and workload data for each of the processing nodes and in part based on the processing node priority data;
store the at least one node peak power threshold and at least one average power threshold in node controller memory;
transmit the node peak power threshold and the node average power threshold to the node controllers of each of the processing nodes; and
trigger the node controllers to determine and set a device peak power limit for each of the at least one variable performance level device within each of the processing nodes based on the node peak power threshold;
trigger each of the plurality of node controllers to determine and set a respective device average power limit for each of the plurality of respective variable performance devices associated with each of the processing nodes based on a respective node average power threshold;
wherein each of the plurality of respective variable performance devices concurrently adjusts a corresponding device performance metric, from among an operating frequency and a data throughput, that applies to a respective one of the variable performance devices, based on the average power limit and a peak power limit of the respective device;
wherein each of the at least one variable performance level device dynamically adjusts the corresponding device performance metric based on the device peak power limit, in order for a current peak power level to remain within or less than the device peak power limit;
determine if a current device peak power consumption is approaching the device peak power limit for at least one of the devices; and
in response to determining that the current device peak power consumption is approaching the device peak power limit, the corresponding device estimates a current peak power level based on the workload data and adjust the at least one of the operating frequency and the data throughput of the corresponding device such that the current peak power level remains less than the device peak power limit.

14. The information handling system of claim 13, wherein:
the variable performance devices comprise one or more devices from among: the at least one CPU; at least one NVMe device, (c) at least one memory device, (d) at least one MIC, and (e) at least one GPU; and
in response to the variable performance device comprising the at least one CPU, setting an operating frequency of the at least one CPU based on the device peak power limit, wherein the operating frequency is a corresponding performance metric;
in response to the variable performance device comprising the at least one NVMe device, setting a data throughput of the NVMe device based on the device peak power limit, wherein the data throughput is a corresponding performance metric;
in response to the variable performance device comprising the at least one memory device, setting a data throughput of the at least one memory device based on the device peak power limit;
in response to the variable performance device comprising the at least one MIC, setting an operating frequency of the at least one MIC based on device the peak power limit;
in response to the variable performance device comprising the at least one GPU, setting an operating frequency of at least one GPU based on device the peak power limit.

15. The information handling system of claim 13 wherein the firmware further configures the power management micro-controller to:
initialize the power management micro-controller during start-up configuration of the IHS;
establish communication between the power management micro-controller, the power supply units and the node controllers;
track, via the node controllers, the processing node power-usage and workload data for each of the processing nodes; and
trigger the node controllers to transmit the power-usage and workload data to the power management micro-controller.

16. The information handling system of claim 13 wherein the node controllers have node controller power control firmware executing thereon and the node controller firmware configures the node controllers to:
determine if the node peak power threshold has been exceeded for at least one of the processing nodes; and
in response to determining that the node peak power threshold has been exceeded for at least one of the processing nodes, concurrently reducing the respective device performance metric of each of the at least one variable performance devices associated with that processing node to a predetermined power level.

17. The information handling system of claim 16 wherein the at least one variable performance devices have device power control firmware executing thereon and the firmware configures the at least one variable performance devices to:
in response to determining that the node peak power threshold has not been exceeded for at least one of the processing nodes, determine if a current device peak power consumption is approaching the device peak power limit for at least one of the at least one variable performance devices; and
in response to determining that the current device peak power consumption is approaching the device peak power limit, the at least one variable performance devices respectively estimates a current peak power level based on the workload data and to adjust the device performance metric of the at least one variable performance devices such that the current peak power level remains less than the device peak power limit.

18. The information handling system of claim 17 wherein the at least one variable performance devices have device power control firmware executing thereon and the firmware configures the at least one variable performance devices to:
in response to determining that the current device peak power consumption is not approaching the device peak power limit, determine if a current node average power consumption has exceeded the node average power threshold for at least one of the processing nodes; and
in response to determining that the current node average power consumption has exceeded the node average power threshold for at least one of the processing nodes, each corresponding variable performance device adjusts the device performance metric of the variable performance device such that the current average device power level is less than the device average power limit.

19. The information handling system of claim 18 wherein the at least one variable performance devices have device power control firmware executing thereon and the firmware configures the at least one variable performance devices to:
in response to determining that the current node average power consumption has not exceeded the node average power threshold for at least one of the processing nodes, allowing the at least one variable performance level devices associated with that processing node to operate using a maximum value of the device performance metric.

* * * * *